(12) United States Patent
O'Connor

(10) Patent No.: US 6,893,094 B2
(45) Date of Patent: May 17, 2005

(54) HEADREST WITH PIVOTABLE SIDE SUPPORT MEMBERS

(75) Inventor: Richard W. O'Connor, San Francisco, CA (US)

(73) Assignee: Dreamwings Corporation, Foster City, CA (US)

( * ) Notice: Subject to any disclaimer, the term of this patent is extended or adjusted under 35 U.S.C. 154(b) by 4 days.

(21) Appl. No.: 10/607,424

(22) Filed: Jun. 25, 2003

(65) Prior Publication Data

US 2003/0234567 A1 Dec. 25, 2003

Related U.S. Application Data

(60) Division of application No. 09/932,587, filed on Aug. 17, 2001, now Pat. No. 6,648,416, which is a continuation-in-part of application No. 09/667,011, filed on Sep. 20, 2000, now Pat. No. 6,305,749, which is a continuation-in-part of application No. 09/374,077, filed on Aug. 12, 1999, now Pat. No. 6,123,389.
(60) Provisional application No. 60/096,426, filed on Aug. 13, 1998.

(51) Int. Cl.[7] .................................................. A47C 1/10
(52) U.S. Cl. ........................... 297/397; 297/399; 5/636; 5/640
(58) Field of Search ................................. 297/397, 399, 297/406, 408; 5/636, 640

(56) References Cited

U.S. PATENT DOCUMENTS

| 2,464,435 A | 3/1949 | Conradt ...................... 297/397 |
| 2,582,571 A | 1/1952 | Thoma ........................ 297/397 |
| 2,587,196 A | 2/1952 | Morecroft ................ 297/397 X |
| 2,613,731 A | 10/1952 | Roginski .................... 297/399 |
| 2,638,152 A | 5/1953 | Pulsifer ....................... 297/399 |
| 2,719,577 A | 10/1955 | Eyman ........................ 297/391 |
| 2,827,110 A | 3/1958 | Rising ........................ 297/399 |

(Continued)

FOREIGN PATENT DOCUMENTS

| DE | 24 49 193 A1 | 4/1976 | |
| DE | 3039934 C2 | 10/1980 | |
| DE | 8810569 U1 | 8/1988 | |
| DE | 3820658 A1 | 12/1989 | |
| DE | 196 53 516 A1 | 6/1997 | |
| DE | 19602909 A1 | 7/1997 | |
| DE | 197 24 764 C1 | 10/1998 | |
| EP | 0 142 822 A2 | 11/1984 | |
| EP | 142822 A2 * | 5/1985 | ................ 297/406 |
| EP | 0152867 | 8/1985 | |
| EP | 0 470 051 A1 | 2/1992 | |
| GB | 2 132 479 A | 7/1984 | |
| GB | 2 224 178 A | 4/1990 | |
| GB | 2 302 268 A | 1/1997 | |
| WO | WO 95/09742 | 4/1995 | |

OTHER PUBLICATIONS

*Qantas Launches A New Era For Business Class,* Times Business Publications, *Business Times (Singapore),* pp. 10,11, Nov.22, 1994.

(Continued)

Primary Examiner—Rodney B. White
(74) Attorney, Agent, or Firm—Blakely, Sokoloff, Taylor & Zafman LLP

(57) ABSTRACT

A headrest. In one embodiment, the headrest includes a rear head support potion and a wing member. In this embodiment, the wing member is rotatable upwardly and downwardly relative to the rear head support member to allow the wing member to be rotated vertically from a stowed position to a head support position. In this embodiment, the wing member is also pivotable horizontally relative to the rear head support portion.

41 Claims, 20 Drawing Sheets

U.S. PATENT DOCUMENTS

| | | | |
|---|---|---|---|
| 2,917,109 A | 12/1959 | Marsh | |
| 2,976,915 A | 3/1961 | Spound | |
| 2,983,310 A | 5/1961 | Warlick | 297/399 |
| 3,283,344 A | 11/1966 | Blanchard | 5/636 X |
| 3,466,091 A | 9/1969 | DeGrusso | |
| 3,537,750 A | 11/1970 | Lohr | 297/397 X |
| 4,030,781 A | 6/1977 | Howard | 297/397 |
| 4,031,578 A | 6/1977 | Sweeney et al. | |
| 4,042,791 A | 8/1977 | Wiseman | |
| 4,130,318 A | 12/1978 | Hemmen et al. | 297/410 |
| 4,205,878 A | 6/1980 | Wooten | |
| 4,339,151 A | 7/1982 | Riggs | 297/397 |
| 4,440,443 A | 4/1984 | Nordskog | 297/397 |
| 4,490,842 A | 12/1984 | Watanabe | |
| 4,619,483 A | 10/1986 | Dickey et al. | 297/397 |
| 4,738,488 A | 4/1988 | Camelio | 297/397 |
| 4,762,367 A | 8/1988 | Denton | |
| 4,776,049 A | 10/1988 | Perron | |
| 4,797,934 A | 1/1989 | Hufnagel | |
| 4,913,491 A | 4/1990 | Mizuno et al. | |
| 4,971,393 A | 11/1990 | Maisenhalder | |
| 4,991,222 A | 2/1991 | Nixdorf | |
| 5,074,574 A | 12/1991 | Carwin | 297/397 X |
| 5,108,150 A | 4/1992 | Stas et al. | |
| 5,135,283 A | 8/1992 | Cassese | 297/397 X |
| 5,154,186 A | 10/1992 | Laurin et al. | 5/625 X |
| 5,161,855 A | 11/1992 | Harmon | |
| 5,220,700 A | 6/1993 | Liu | 5/636 |
| 5,345,633 A | 9/1994 | Harnish | 297/397 |
| 5,370,446 A | 12/1994 | Bancod | |
| 5,411,468 A | 5/1995 | Chen | 297/391 X |
| 5,443,303 A | 8/1995 | Bauer et al. | |
| 5,467,782 A | 11/1995 | Wiseman | 5/636 |
| 5,505,523 A | 4/1996 | Wang | 297/397 |
| 5,513,897 A | 5/1996 | Lemmen | |
| 5,531,505 A | 7/1996 | Baetz et al. | 297/408 |
| 5,544,378 A | 8/1996 | Chow | 5/640 |
| 5,613,736 A | 3/1997 | Schaked | 297/397 |
| 5,669,665 A | 9/1997 | Nowakk | 297/397 X |
| 5,669,668 A | 9/1997 | Leuchtmann | |
| 5,752,742 A | 5/1998 | Kerner et al. | 297/406 X |
| 5,800,019 A | 9/1998 | Knightlinger | 297/397 X |
| 5,806,933 A | 9/1998 | Tsui et al. | |
| 5,868,471 A | 2/1999 | Graham | 297/397 |
| 5,918,933 A | 7/1999 | Hutchenson et al. | 297/397 X |
| 5,967,613 A | 10/1999 | McKeever | 297/397 |
| 5,997,091 A | 12/1999 | Rech et al. | |
| 5,997,097 A | 12/1999 | Engelhard | |
| 6,120,099 A | 9/2000 | Reikerøs et al. | 297/406 X |
| 6,123,389 A | 9/2000 | O'Conner | 297/397 |
| 6,158,813 A | 12/2000 | Karash | 297/397 X |
| 6,224,158 B1 | 5/2001 | Hann | 297/391 |
| 6,250,716 B1 | 6/2001 | Clough | 297/391 X |
| 6,305,749 B1 | 10/2001 | O'Connor et al. | 297/397 |
| 6,435,617 B1 | 8/2002 | McNair | 297/397 |
| 6,467,846 B2 | 10/2002 | Clough | 397/391 X |
| 6,513,871 B2 | 2/2003 | Bartels | 297/406 X |
| 6,594,839 B1 * | 7/2003 | Papay | 5/637 |
| 6,601,804 B2 * | 8/2003 | Bisch | 248/118 |
| 6,648,416 B2 * | 11/2003 | O'Connor et al. | 297/397 |
| 2001/0040401 A1 | 11/2001 | Lin | 297/397 |
| 2002/0067063 A1 | 6/2002 | Taborro | 297/397 |
| 2003/0030309 A1 | 2/2003 | Pal et al. | 297/391 X |

OTHER PUBLICATIONS

*Weekender; Asian Crisis Offers Opportunities For SQ,* BusinessWorld Publishing Corporation, *BusinessWorld,* p. 32, Sep. 25, 1998.

Sloan, Gene, *Culture Defines Singapore Airlines Executive Cheong Choong Kong Takes A Hard Look At The Industry,* Gannett Company, Inc., *USA Today,* Section: LIFE, p. 8D, Oct. 2, 1998.

*Megatops Take Off In First Class Style; James O'Brien Looks At Singapore Airlines' Pounds 250 Million Revamp Of Its Passenger Services,* Midland Independent Newspapers plc, *Birmingham Post,* p. 21, Oct. 7, 1998.

*Singapore Airlines Announces S$500 Million (US $300 Million) Product Launch,* PR Newswire Association, Inc., *PR Newswire,* Section: Financial News, Sep. 16, 1998.

*India–S'pore Airlines Upgrading Facilities,* FT Asia Intelligence Wire, *Business Line,* Section: Business, Sep. 13, 1998.

Thomas, Geoffrey, Sia ready Too Spend Despite Asian Recession, The McGraw–Hill Companies, Inc. *Aviation Week and Space Technology,* Section: Air Transport; vol. 149, No. 13; p. 63, Sep. 28, 1998.

Singapore To Spend $300 Million On Total Airline Upgrade, The McGraw–Hill Companies, Inc., *Aviation Daily,* vol. 333, No. 52; p. 451, Sep. 14, 1998.

* cited by examiner

HEADREST WITH PIVOTABLE SIDE SUPPORT MEMBERS

RELATED APPLICATIONS

This application is a divisional of application Ser. No. 09/932,587 filed Aug. 17, 2001, now U.S. Pat. No. 6,648, 416, which is a continuation-in-part of U.S. application Ser. No. 09/667,011 filed Sep. 20, 2000, now U.S. Pat. No. 6,305,749 which is a continuation in part of U.S. application Ser. No. 09/374,077, now U.S. Pat. No. 6,123,389, filed on Aug. 12, 1999, which claims the benefit of U.S. Provisional Application Serial No. 60/096,426, filed Aug. 13, 1998.

BACKGROUND

1. Field

The present disclosure generally relates to headrests. More particularly, the present disclosure pertains to headrests that may be used in connection with or be integrally formed with vehicle seats, such as car seats, train seats, airplane seats, child seats, or which may be used in conjunction with or form a part of furniture, stretchers, beds, or the like.

2. Description of Related Art

Generally, a passenger in a passenger vehicle, such as an automobile, airplane, bus or train, suffers significant neck strain when resting since seats in such passenger vehicles typically provide support only to the back portion of the passenger's head. More specifically, since seats in such passenger vehicles are not designed to keep the passenger's head in a substantially upright, vertical orientation relative to the passenger's torso (e.g., when the passenger is at rest or sleeping), neck strain may result due to the natural instability of an unsupported head when no muscles are being used to support the head.

In order to alleviate such neck strain, various devices have been developed. For instance, pillows designed to fit around the backside of the passenger's neck have been developed. Such neck pillows are inflatable with air or consist solely of a foam material. However, such neck pillows generally do not provide adequate support to inhibit neck strain due to their readily deformable or "sponge-like" nature. Further, use of such neck pillows tends to allow the entire body of the user to slide sideward because lateral acceleration causes the passenger's body to slip against the seat. In addition, such neck pillows typically do not allow passengers to adjust the configuration of the device to suit the passenger's tastes or dimensions.

BRIEF DESCRIPTION OF THE FIGURES

The present invention is illustrated by way of example and not limitation in the Figures of the accompanying drawings.

FIG. 24b illustrates a side view of the embodiment of FIG. 24a.

DETAILED DESCRIPTION

Figure 1:
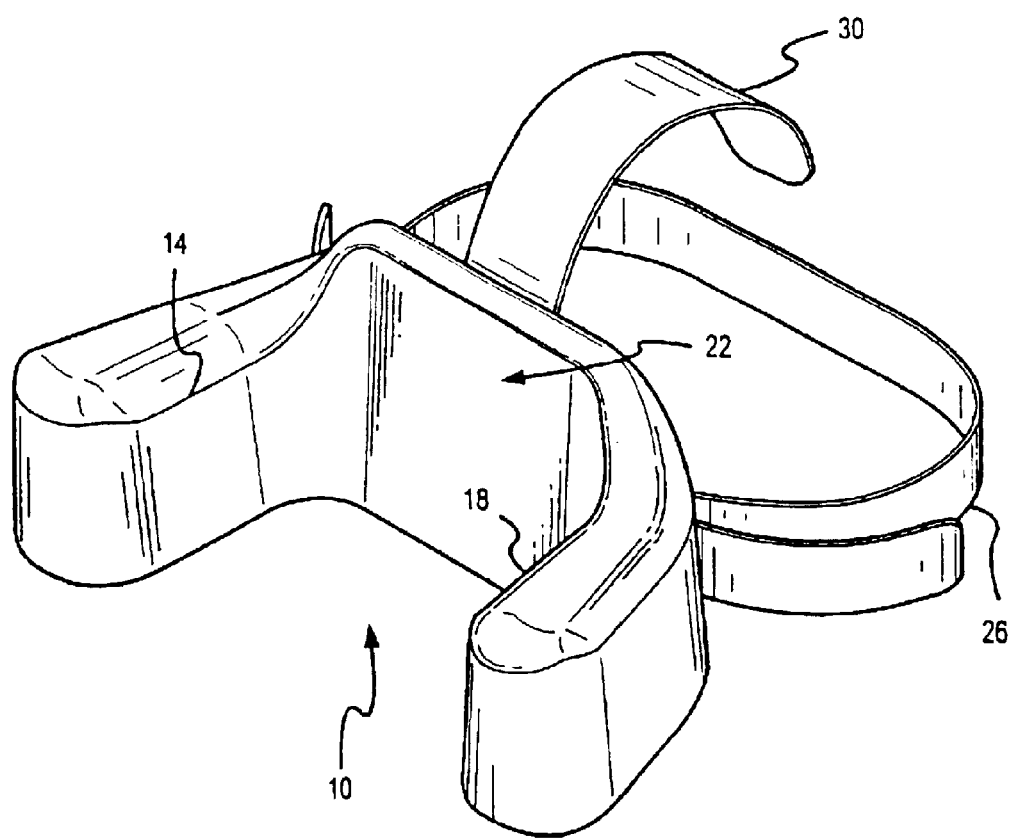
FIG. 1 is perspective view of one embodiment of the headrest of the present invention.

The following description provides a description of various features and embodiments of headrests. In the following description, numerous specific details such as material types, shapes, fasteners, dimensions, and the like are provided in order to provide a more thorough understanding of the present invention. It will be appreciated, however, by one skilled in the art that the invention may be practiced without such specific details.

In one embodiment, the present invention is embodied in a headrest for use in various land-based and air-based vehicles, such as automobiles, buses, trains and airplanes. Generally, the headrest of the present invention may include a frame comprising a back member for supportably engaging at least a back portion of a person's (e.g., passenger's) head and first and second wing members for supportably engaging first and second side portions, respectively, of the person's head, and a first interconnecting member for attaching at least the back member to a seat. The first and second wing members function to inhibit neck strain by supporting first and second side portions of the passenger's head (e.g., cheekbone portions), respectively, when the passenger falls asleep (depending upon to which side the passenger's head is leaning). In one embodiment, the first and second wing members are integrally formed with first and second end portions of the back member as a unitary structure. In another embodiment, the first and second wing members are pivotally interconnected to first and second end portions of the back member, respectively. In both of these embodiments, the first and second wing members, in cooperation with the back member, provide a rigid structure or frame to support a person's head when such person's head falls to one side or the other when such person falls asleep. In addition, such headrest may be utilized in various configurations due to the adjustability of the first and second wing members. By virtue of this arrangement, virtually uninterrupted sleep may be achieved without substantial neck strain since some embodiments of the headrest of the present invention can supportably engage either or both sides of a person's head with the wing members. In an alternative embodiment, the headrest of the present invention includes only a single wing member interconnectable to the back member.

More specifically, in one embodiment, the headrest includes a substantially C-shaped or U-shaped frame and an interconnecting member for attaching the frame to a seat, such as a passenger seat utilized in automobiles, airplanes, buses and trains or an office-type of chair. In this embodiment, the rigid frame includes a back member for supportably engaging at least a back portion of a person's head and first and second wing members integrally formed with the back member at first and second end portions of the back member. Such wing members are capable of supportably engaging first and second side portions of the person's head. The frame may comprise a rigid or semi-rigid material having a modulus of elasticity (e.g., at least about $10^6$ PSI) and/or a yield strength of between about 3,000 PSI and about 30,000 PSI. In this regard, the first and second wing members may be bent relative to the back member, such that the size of the cavity defined by the first and second wing members and back member is variable. As such, due to the adjustability of the first and second wing members relative to the back member, various head sizes and configurations of the head support may be achieved while providing support to either side of an unsupported head at rest. The wing members are generally 6–7 inches in length from the back member to the tips of the wing members. The headrest of the present invention may also be used as a support device in other applications (e.g., lumbar area in automobile seats, the thoracic/rib cage area or the leg or seat area of automobile seats, or alternatively, hospital beds, Rotorest™ or any lateral motion therapy bed). Such a support may be utilized in other seats, such as dental chairs to locate or position a patient's head in a fixed position, massage tables, chiropractic chairs and tables, and physical therapy tables (e.g., to strengthen the patient's neck if injured and in need of physical therapy by applying torque to the wing members). Other uses of the support include recliner chairs, chaise lounge chairs and infant or children's seats (e.g., car seats).

In another embodiment, width adjustability of the headrest is provided by first and second hinge members, which hingedly interconnect the first and second wing members, respectively, to first and second end portions of the back member, respectively. In order to provide such adjustability, such that the first and second wing members are capable of supporting first and second side portions of a person's head, the first and second hinges may include a pivot adjustment mechanism for releasably maintaining the first and second wing members, independently, at any of a plurality of pivot positions relative to the back member. In this regard, the first and second wing members may be moved to desired configurations/positions relative to the back member and releasably fixed in such configurations/positions to support first and second side portions of a person's head when resting. Such adjustment not only provides comfort to the user, but also may facilitate easy storage of the headrest by providing a foldable headrest (e.g., a headrest capable of lying flat), which occupies less space than other conventional headrests. In one embodiment, the hinge members comprise unbalanced hinges requiring less torque to move the first and second wing members inwardly than to move the first and second wing members outwardly, towards an unfolded, open configuration. Such hinges (e.g., clutch spring hinge) also function to dampen the loads to provide a more comfortable ride to the user. In an alternative embodiment, adjustability of the wing members is provided by motorizing the wing members by placing a geared motor(s) proximate the hinges interconnecting the wing members to the back member. Such geared or coupled motor(s) enables the user to easily adjust the angle of each wing member relative to the back member. In yet another embodiment, the hinges are adapted to allow the wing members to not only move inwardly and outwardly relative to the back member, but also upwardly and downwardly (i.e., vertically) relative to the back member, to thereby allow the wing members to be stowed along the ends (i.e., sides) of the back member. In this embodiment, such hinges may further include a pin joint or may otherwise comprise a ball joint. Alternatively, the hinges may be adapted to allow the wing members to move only upwardly and downwardly relative to the back member, the wing members being oriented in fixed relation relative to the back member at about 20 degrees to allow a person's head to rest against one or both wing members. For purposes of providing a light-weight yet durable headrest, the first and second wing members and/or the back member may comprise a light-weight metal, such as aluminum, wood, composites, or a plastic, such as high density polyethylene (HDPE).

Some embodiments of the headrest of the present invention may be interconnected to a passenger seat of a vehicle in various fashions, depending upon whether the embodiment is to replace a removable headrest interconnected to a back seat portion of a passenger seat, or is to be utilized as a kit-type of add-on to an existing headrest of a passenger seat. In one embodiment, in instances where the headrest of the present invention will replace a conventional removable headrest, the interconnecting member for attaching the headrest to the back seat portion of the passenger seat comprises at least a first post or stem (e.g., blade) which is interconnected or integrally formed with the back member of the headrest. Such post or stem may be configured to be received within an existing post-receiving channel which extends vertically through at least a portion of the back seat portion of the passenger seat. Such posts or stems are particularly useful when combined with the headrest of the present invention to provide lateral support to users when subjected to torque loading. In instances where the headrest will be attached to an existing, conventional headrest of a passenger seat, the interconnecting member may comprise a first strap adapted to extend around the perimeter of the conventional headrest. Such strap may be of a non-slip nature (e.g., non-slip suede, vinyl, or other similar high coefficient of friction material) and include at least a first fastening mechanism, such as Velcro, buckles, clamps, cinches, etc. for securing the strap about the conventional headrest of the passenger seat. Such non-slip material inhibits migration of the headrest relative to the seat.

For purposes of providing comfort to the passenger, the headrest of the present invention may further include padding and a cover. In one embodiment, where the frame comprises a unitary, integrally formed structure, the padding may include a molded foam member which is receivable over the frame, such that the frame is not exposed or otherwise contactable with the passenger's head. In order to provide sufficient comfort while supporting a person's head, in one embodiment, the padding has 25% impact load deflection (ILD) of between about 1.0 to about 3.5 and, in a preferred embodiment, between about 1.6 to about 2.5. In one embodiment, the 25% ILD of the padding is about 2.3. In one embodiment, the padding comprises a gel or foam material, such as a Tempurepedic™ foam (e.g., a heat sensitive, highly conformable polyurethane). In another embodiment, the padding may comprise first and second layers, whereby the first layer of padding has a durometer greater than the second layer of padding, the first layer of padding in abutting relation with the frame. In addition, in order to enhance adherence of the padding to the frame, the frame may include a plurality of hollowed or cut out areas while reducing the potential for delamination and damage to the headrest. Alternatively, the padding may comprise separate foam members each covering a specific portion of the frame. For example, first and second wing foam members may cover the first and second wing members, respectively, while a back foam member covers the back member. The padding may also include a neck roll for abuttingly engaging a back portion of a user's head (e.g., protrusion on lower, back area of person's head, about the neck area). Such neck roll functions to position or align the user's head with the wing members and further to be the primary loading point on the back of the user's head. The neck roll enhances positioning of the wing members relative to the user's eyes, such that the user can see over the wing members due to neck roll functioning as the primary locator point. In other embodiments, the padding of at least the wing member is a sound absorbing foam adapted to inhibit noise penetration (e.g., when the wing members are positioned over the user's ear(s). In another embodiment, the first and second wing members include first and second sound speakers, respectively, which are in electrical communication (e.g., via a standard jack phone system) with a portable stereo or other similar device (e.g., automobile stereo, airplane sound system, etc.). Alternatively, such stereo system may be battery-powered and incorporated into the headrest. In still another embodiment, the first and second wing members may include commercially available noise cancellation circuitry that is adapted to cancel ambient noise by generating 180° phase shifted frequencies to those ambient, thereby canceling the noise at the user's ear(s). In yet another embodiment, the wing members may include a sound system adapted to generate repeating or constant frequencies that are soothing to listeners. Such sound system may be positioned in the wings or in the back member with controls (e.g., knobs) on the backside (e.g., non-head supporting) surface of the wings for easy control access during use. In still another embodiment, the headrest may include a pitch control mechanism, to provide further comfort to the user, such pitch control to allow the headrest to roll forward on a pawl that supports the headrest in a first, forward position until it is rolled fully forward at which point the pawl is released to allow the headrest to go back to an aft position.

In another embodiment, the present invention is related to a portable headrest which is adapted for use on a seat having an upper portion of a seatback for engaging the backside of a person's head. Generally, this embodiment of the present invention includes first and second wing portions capable of abuttingly engaging first and second side portions of a person's head, respectively, a neck support member capable of supporting or engaging a neck portion of the person's head or a base of the head portion of the person, the neck support member interconnecting or extending between the first and second side portions, and an interconnecting member for interconnecting the headrest to the seatback. Advantageously, the portable headrest of this embodiment of the present invention is designed to allow, if desired, the backside of a person's head to be supported by the existing headrest or upper portion of the seatback (e.g., of a seat in vehicle or airplane). In this regard, the present invention is based, at least in part, upon applicant's recognition of a problem with various existing headrests, which can position a user's head undesirably forward of the user's torso or back due to the fact that a number of existing headrests utilize a thick pad (in addition to the headrest or upper portion of the seatback) to supportably engage the backside of a person's head and the fact that the headrest or upper portion of seatback in newer model cars are typically positioned forward or proximal the back support portion of the seatback.

Alternatively, in the event such support is desired (e.g., in instances where the existing headrest on an upper portion of a seatback is not configured to be oriented forward or proximal a back support portion of the seatback), the present invention can accommodate such by providing a releasably securable pad adapted to be interconnected to the headrest to abuttingly engage the backside of a person's head.

In one embodiment, the interconnecting member comprises a first strap routable through first and second swivels mounted on the first and second portions of the neck support member. Such configuration allows the some embodiments to be securely interconnected to the upper portion of a seat while facilitating independent movement of each of the first and second wing portions to desired pivot positions. In this regard, the pivot positions of the first and second wing portions may be adjusted without having to remove the headrest from the seat and/or without having to loosen the strap. Such first strap may be secured about the perimeter of the upper portion of the seat, or alternatively about the rear or back side of the upper portion of the seat, with the neck support member abuttingly engaging the front side of the upper portion of the seat to securely interconnect this embodiment of a headrest of the present invention to the seat.

The portable headrest may further include first and second torsion springs for pivotally interconnecting the first and second wing portions to the first and second end portions of the neck support member, respectively, in order to allow the wing portion to be angularly adjusted to various desired positions. In this embodiment, for purposes of adequately supporting the person's neck while allowing the first and second wing portions to support side portions of the person's head (e.g., proximate the cheek bones), the first and second end portions of the neck support member extend vertically upwardly relative to the horizontally extending center portion of the neck support member. Such first and second wing portions may be interconnected to the neck support member's end portions via the first and second torsion springs, respectively. In an alternative embodiment, the first and second wing portions are integrally formed with the neck support member to provide a unibody frame.

Furthermore, for purposes of providing a lightweight headrest, the neck support member and/or the first and second wing portions may be tubular. For these embodiments, the neck support member and/or first and second wing members may be fabricated from a lightweight metal, such as aluminum, or a plastic material. Padding may be positioned on the wing portions and/or the neck support member to comfortably support the sides of the user's head and/or the neck of the user, respectively.

In another embodiment, the present invention is directed to a portable headrest adapted to be releasably securable to a headrest or upper portion of a seat's seatback. In one embodiment, the headrest is adapted to be easily and efficiently securable to the upper portion of a seat's seatback with or without the use of straps or other interconnecting devices. In this embodiment, the portable headrest includes first and second wing portions adapted to supportably or abuttingly engage side portions of a person's head, a center member positioned distally relative to the first and second wing portions for engaging a back surface of the seatback (e.g., an upper portion of the back surface of the seatback), and first and second intermediate portions extending between the first and second wing portions and the first and second end portions of the center member, respectively. The portable headrest in this embodiment allows a user to rest the backside of the person's head against the front surface of the upper portion of the seatback, if desired. In order to releasably secure this embodiment of the headrest of the present invention to the upper portion of the seatback, the first and second intermediate portions are substantially U-shaped. In one embodiment, the first and second intermediate portions are configured to compressively engage (e.g., pinch) the upper portion of the seatback to hold the portable headrest in place. In particular, the first and second intermediate portions may each include opposing first and second legs the first and second legs being spaced apart at least a first distance (e.g., proximate the center member), the first distance being less than the space between the front and back surfaces of a selected portion of the upper portion of the headrest. The first and second wing portions, first and second intermediate portions and the center member may be integrally formed to provide a unibody frame. In an alternative embodiment, the first and second wing portions are pivotally or hingedly interconnectable to corresponding end portions of the first and second intermediate portions via torsion springs. The portable headrest of the present invention may further comprise first and second wing pads positionable on the first and second wing portions, respectively, to provide comfort to the user. In an alternative embodiment, the headrest may be configured such that the center member engages a top portion of the seatback, and a strap may be utilized to secure the headrest to an upper portion of the seatback.

In another embodiment, the first and second wing portions of the headrest of the present invention are configured/designed in order to inhibit injuries to a person's head in the event of a collision. More specifically, the first and second wing portions may have a scoop configuration, wherein the tip or end portion of the wing is off/access, such that if the wing is positioned 90 degrees relative to the center or neck support member, in the event of a collision, or sudden breaking, the impact force has a moment outside of the hinge which should cause the wing portion or member to swing away. In another embodiment, the wing members are collapsible scoops, in configuration, such that the scooped wing member acts as a crush zone (e.g., the wing member may comprise plastic which would buckle or bend under an impact). Such a collapsible wing member also has a straight or non-curved configuration.

FIGS. 1–4B illustrate the various features and characteristics of some embodiments of the present invention. Generally, for purposes of supporting a person's head when such person falls asleep in a seated or prone position (e.g., when seated or lying down in a car seat, train seat, airplane seat, bus seat, etc. or a chair), some embodiments of the headrest of the present invention generally include a rigid or semi-rigid frame having first and second wing members and a back member interposed therebetween, and at least a first padding member interposable between the person's head and at least one of the first and second wing members and back member. Due to the support provided by the rigid or semi-rigid frame, neck strain is substantially inhibited or otherwise reduced.

Figure 2:
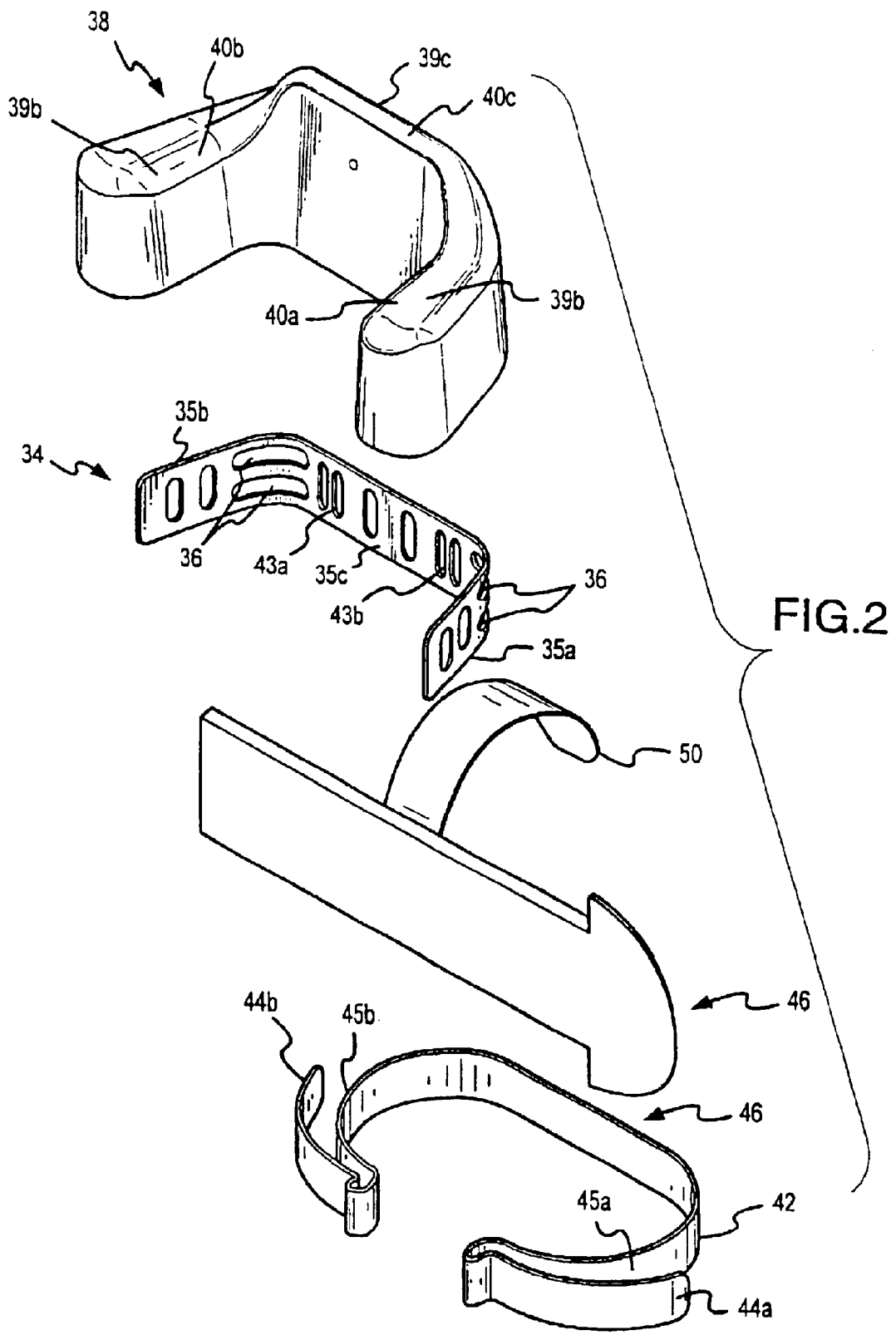
FIG. 2 is an exploded view of the headrest illustrated in FIG. 1.
Figure 3A:
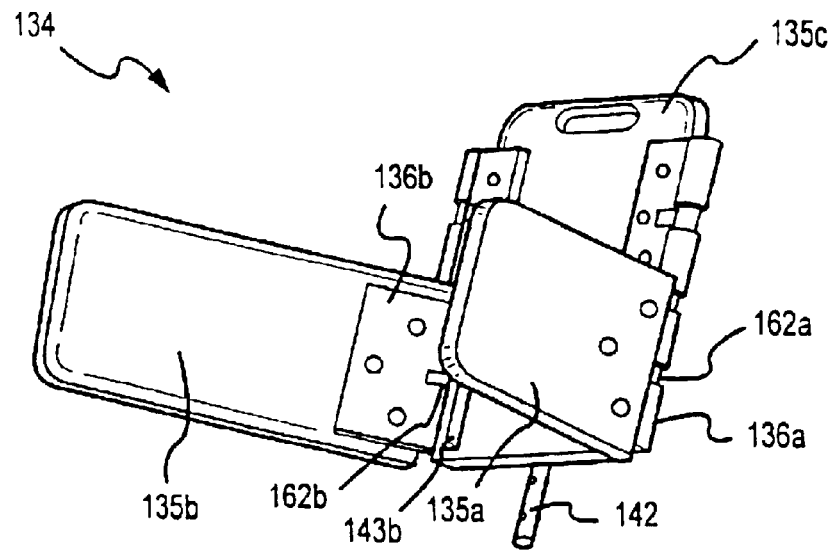
FIGS. 3A–3B are perspective views of another embodiment of the frame of the headrest of the present invention.
Figure 3B:
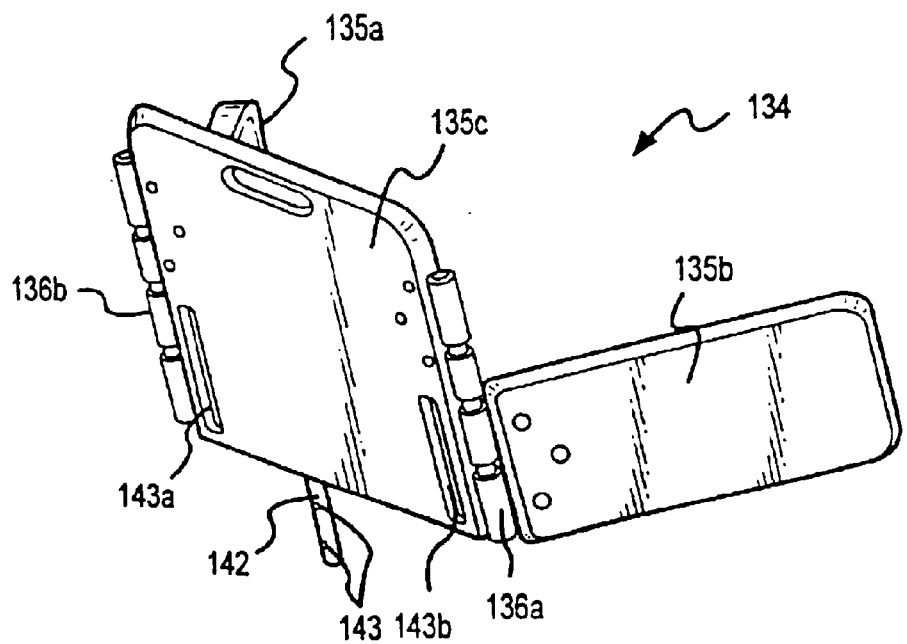

Referring to FIGS. 1–2, in one embodiment of the headrest of the present invention, the headrest 10 generally includes first and second side or wing portions 14, 18 for supportably engaging side portions of a person's head, especially when the person is seated, a back portion 22 for supportably engaging a back portion of a person's head, especially when at rest, and an interconnecting member 26 for securing the headrest to a seat. For purposes of inhibiting slippage of the headrest 10 relative to a seat, in this embodiment, the headrest 10 further includes a pitch restraint member 30 which is adapted to engage (e.g., in a pressure fit manner) a top portion of the seat (e.g., an existing headrest portion of the seat).

More specifically, and referring to FIG. 2, the headrest 10 of this particular embodiment of the present invention includes a semi-rigid or rigid frame 34, a padding member 38 and a strap 42 for interconnecting the headrest to a seat. For purposes of adequately supporting a person's head, and in particular a person's head when the person is asleep and the head is tilted to one side or the other, the frame member 34 is generally C-shaped or U-shaped, and includes first and second wing members 35a, 35b for supporting a person's head (e.g., side portions of the person's unsupported head) and a back member 35c, which is adapted to provide the interface between the first and second wing members 35a, 35b and the seat, via the strap 42, which is feedable through the vertical slots 43a, 43b of the back member 35c (which will be described in more detail hereinbelow). In this embodiment, the first and second wing members 35a, 35b are integrally formed with the back member 35c. In addition, in order to provide adjustability in the size of the cavity formed by the headrest 10 (e.g., width adjustability), the first and second wing members 35a, 35b are pivotable relative to the back member 35c. In this regard, the frame 34 may comprise a bendable material, such as aluminum, aluminum alloys, plastic, composite or steel. The frame 34 is sufficiently stiff to support lateral loads of up to 8 pounds (i.e., 40 in.-lbs.) at the tips of the wing members 35a, 35b and to support the weight of the wings. In this regard, the headrest may fold to a flattened configuration if 45 in.-lbs. or more were applied to the wing members. Such a headrest provides safety features as it would buckle under light impact loads to the tips of the wing members (i.e., column strength is weak) and 45 in.-lbs. under lateral loads. Such frame may be fabricated from a thermoplastic elastomer, such as Hytrel. Alternatively, the frame may be fabricated from a shape memory alloy, such as nickel titanium, which could provide for some adjustability of the wing members relative to the back member. As such, the frame member 34, and specifically, the first and second wing members 35a, 35b are capable of being bent relative to the back member 35c, in a hinge fashion, and are capable of substantially maintaining such orientation relative to the back member to suitably support a head at rest thereon. Such width adjustability is enhanced by providing at least one cut out or slotted area 36 in each hinge area of the frame member 34. Advantageously, the first and second wing members 35a, 35b are independently movable relative to each other and the back member 35c, which enables a user to move the wing members to any of a number of desired positions relative to each other and to the back member 35c. It should be noted that such cut out areas 36 also function to ensure that the padding member 38 is anchored to the frame member 34 as portions of the padding member 38 proximate such cut out areas 36 fill such cut out areas 36.

The strap 42 generally functions to interconnect the frame member 34 to a seat or chair. In this embodiment, and referring to FIGS. 1 and 2, the strap 42 is receivable within the slots 43a, 43b of the back member 35c, and comprises a hook and loop fastener (e.g., Velcro) to secure end portions 44a, 44b of the strap 42 to intermediate portions 45a, 45b of the strap 42, respectively, whereby a middle portion 46 of the strap is loopable around a back portion of a seat. Use of such a strap 42 allows for a quick and efficient installation onto a seat without endangering passengers positioned in back of the seat. Alternatively, the strap may include one or more buckles, cinches, clamps and other similar fastening devices for attaching the headrest 10 onto a seat. Such strap 42 enables this embodiment of the headrest 10 of the present invention to be secured to substantially any type of in-place existing headrest of a seat, such as automobile seats, airplane seats, train seats, bus seats, office chairs and other similar types of seat structures.

As noted hereinabove, the headrest 10 also includes a padding member 38. In one embodiment, the padding member is a molded foam headrest. The frame member 34 may be molded into the padding member 38. Generally, the inner surfaces of the first and second wing portions 39a, 39b of the padding member 38 are fully radiused so that side portions of an unsupported head of a person can contact the headrest at virtually any angle, from horizontal to vertical, in a comfortable manner. The back portion 39c of the padding member 38 transitions to the wing portions 39a, 39b in a relatively large radius, upon which an unsupported rear portion of a head may be supported. Further, in this embodiment, for purposes of adequately supporting a person's unsupported head, the padding member 38 has a 25% ILD between about 1.6 and about 2.6, and more particularly, between about 1.8 and about 2.4. In a preferred embodiment, the 25% ILD of the padding is about 2.1. Alternatively, in order to enhance comfort, a first layer in contact with the frame member 34 may comprise a stiff, light weight foam while a second layer interposable between the head of a person and the first layer may have a softer, lower durometer to provide a softer, more cushioned support. Finally, the padding member 38 is configured to adequately support the back portion of a person's head while supportably engaging cheekbone portions of a person's head. More specifically, the padding member 38 is configured such that the top surface 40c of the back portion of the padding member is higher than the top surfaces 40a, 40b of the wing portions 39a, 39b.

Optionally, and as illustrated in FIG. 2, the headrest 10 may further comprise a cover 46 for enhancing comfort and for facilitating cleaning of the headrest 10. In one embodiment, the cover comprises leather, lycra, cotton, vinyl, Polartec® or other similar materials. The cover is removable and should be washable for hygiene purposes. In addition, the cover should be configured to snugly fit about the padding member 38 and may additionally include slots on the backside thereof to accommodate the strap 42. The headrest 10 may further include a pitch restraint member 50 interconnectable to the cover or frame. The pitch restraint member 50 is a vertical strap interconnectable to the top part of the back member 22, the strap 52 being loopable over the top of the headrest 10 and releasably attachable to the cover 46 via a fastener (e.g., Velcro, snap, buckle, etc.). The pitch restraint strap 50 provides a three point mount to secure the headrest 10 to a seat headrest, which inhibits rolling down of the headrest 10 when a user leans against one of the wing members 35a, 35b.

In another embodiment, illustrated in FIGS. 3A–5, the headrest is adapted as a replacement for existing removable headrests on automobile-type seats. Generally, the headrest 110 illustrated in FIG. 5 includes first and second side portions 114, 118, a back member 122 and an interconnecting member 142 for securing the headrest to an existing seat. More specifically, and referring to FIGS. 3A–3B, the headrest includes a semi-rigid or rigid frame 134 comprising first and second wing members 135a, 135b which are pivotally interconnectable to a back member 135c via hinge members 136a, 136b, and first and second wing pad members 139a, 139b for covering first and second wing members 135a, 135b, along with a back pad member 139c for covering the back member 135c. Also included is an additional neck roll pad 139d on the back pad member 139c for abuttingly engaging a or lower area of the backside of a person's head. In this embodiment, the first and second wing members 135a, 135b and the back member 135c function to provide a rigid support structure for supporting an unsupported head of a person at rest or seated, substantially as described hereinabove with respect to the embodiment illustrated in FIGS. 1–2. In this regard, the first and second wing members and back member 135a, 135b, 135c may comprise a rigid material, such as aluminum, plastic, steel or other composite. The wing members 135a, 135b are generally rectangular in shape, and have a height less than that of the back member 135c. In addition, for purposes of reducing viewing interference when a user wishes to look sideways, such that the user can rest while looking over the wing members, the neck roll pad 139d is positionable between the upper and lower walls of the wing members 135a, 135b. Advantageously, the width of the back member 135c is about 6.5 inches, plus or minus 0.5 inch, such that the head of the user will be comfortably received within the cavity of the headrest without having to adjust the wing members 135a, 135b inwardly to such a degree (e.g., 80 degrees or more relative to the back member) that the wing members become a safety concern, especially in instances of acceleration or deceleration where the head may be forced back toward the headrest. Of importance, in this embodiment, the hinge members 136a, 136b function to allow pivotal or hinged movement of the wing members 135a, 135b relative to the back member 135c. Such pivotal movement of the first wing member 135a is independent of the pivotal movement of the second wing member 135b to provide numerous comfort configurations for the user. Such hinge members 136a, 136b also allow the headrest 110 to be used or otherwise stowed in a flattened configuration (e.g., 180 degrees relative to each member, or otherwise folded to provide a compact, easily storable headrest). Although the degree of rotation of the first and/or second wings may be varied relative to the front surface of the back member 135c, for safety reasons, rotation of the first and second wing members 135a, 135b, in a preferred embodiment, is limited to less than about 250 degrees relative to a front surface of the back member 135c.

In one embodiment, the first and second hinge mechanisms 136a, 136b comprise unbalanced hinges (e.g., springs with definable friction consistent over a range of motion, such as clutch springs, torsion springs, etc.), whereby a first torque is required to rotate the first and second wing members 135a, 135b inwardly, towards the front surface of the back 135c, and a second torque different than the first torque is required to rotate the first and/or second wing member 135a, 135b outwardly, away from the front surface of the back member 135c. The first torque may be less than the second torque. For instance, the first torque required to rotate the first and/or second wing members 35a, 135b inwardly is about 25 inch pounds while the second torque required to rotate the first and/or second wing members 135a, 135b outwardly, relative to the back member 135c is about 35 inch pounds. In this regard, the hinge mechanisms 136a, 136b, in cooperation with the first and second wing members 135a, 135b and the back member 135c can support an unsupported head of a person while maintaining their respective position and/or orientation relative to each other. In another embodiment, the hinges may comprise a hinge mechanism which is adapted to allow the first and/or second wing member to be rotated inwardly and/or outwardly relative to the front surface of the back member 135c, such that the first and/or second wing members 135a, 135b are substantially parallel to the back member 135c to facilitate storage of the headrest. In this embodiment, the hinge mechanisms 136a, 136b define hinge axes which are coplanar and parallel to each other. In another embodiment (not shown), the hinge axes may be coplanar and not parallel to potentially provide enhanced comfort to a user. In addition, the first and second hinge mechanisms may be balanced hinges. Further, in still another embodiment, the hinge mechanism may comprise an adjustable coil mechanism.

For safety purposes, the wing members can be limited in their degree of motions. In this regard, the headrest 110 further includes first and second wing rotation stops 162a, 162b which function to ensure that the wing members 135a, 135b do not close (i.e., rotate inwardly). The wing rotation stops 162a, 162b thus prevent the wing members 135a, 135b from rotating beyond a selected orientation relative the back member 135c, which is especially useful in instances (e.g., accidents) during sudden braking or deceleration where the user may be thrown back against the headrest 110. As such, the wing rotation stops 162a, 162b limit the wing members 135a, 135b from rotating inwardly or forwardly relative to the back member 135a beyond a selected angle (e.g., 70 degrees). In one embodiment, the wing rotation stops 162a, 162b include a bar comprising metal or other high strength material mountable to the end portion of the back member, the bar adapted to bear upon the wing members when the wing members 135a, 135b rotate inwardly. Alternatively, the wing rotation stops 162a, 162b comprise a roll pin or dowel mounted on each of the spindles of the tension spring plates (i.e., hinges) varying the position of the wing members 135a, 135b relative to the end portions of the back member (e.g., extending the distance between the wing member mounting holes and the back member), or by mounting a bar or a rod between the two plates of each hinge, such bar being mounted along the axes of the hinge spindles but offset the diameter of the spindles and material to enable it to swing until contacting the hinge plate of the other section. In still another alternative embodiment, high durometer foam wedges are positionable on the front faces of the wing members. Such wedges may be bonded or glued to the wing members, and would allow the wing members to rotate no more than 70 degrees forward (e.g., from a flat configuration) with 45 degrees of the 70 degrees being limited by the wing frame and the remaining 25 degrees by the wedge for each wing member. The headrest may alternatively include an automatic wing retraction system (e.g., if wings are motorized) which would function to retract the wings to a flat configuration (e.g., substantially planar with back members) when sudden acceleration or deceleration is sensed. In this regard, the wing retraction system may include a "g" sensor or an airbag type of trigger sensor to initiate retraction of the wings.

Figure 4A:
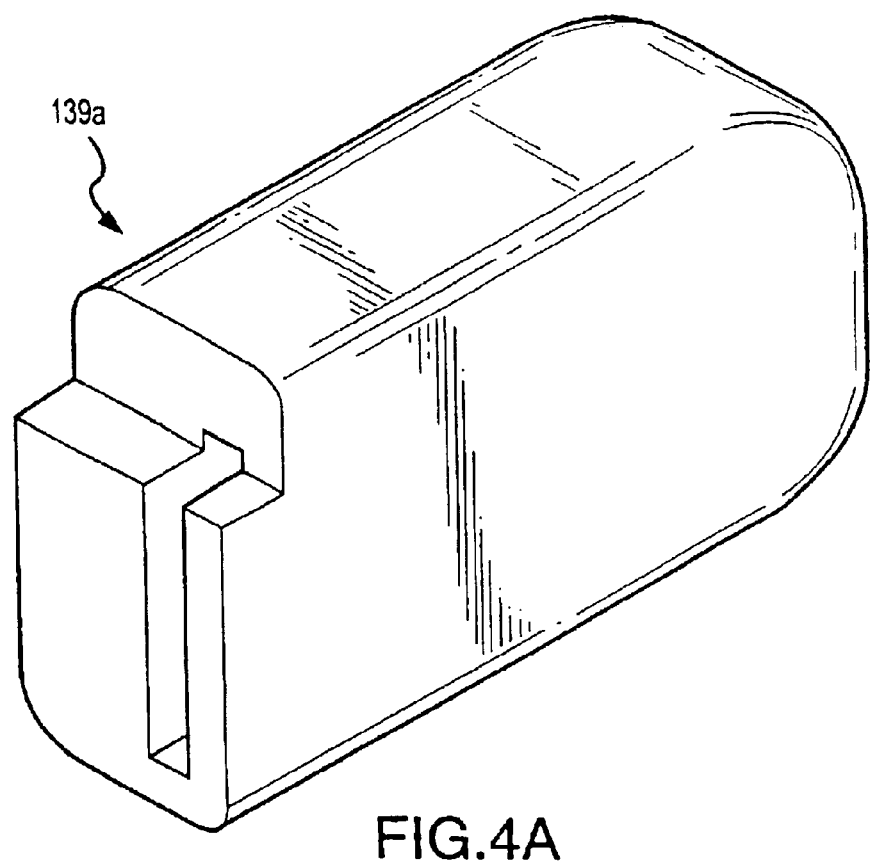
FIGS. 4A–4B are perspective views of the padding of the headrest of the present invention.
Figure 4B:
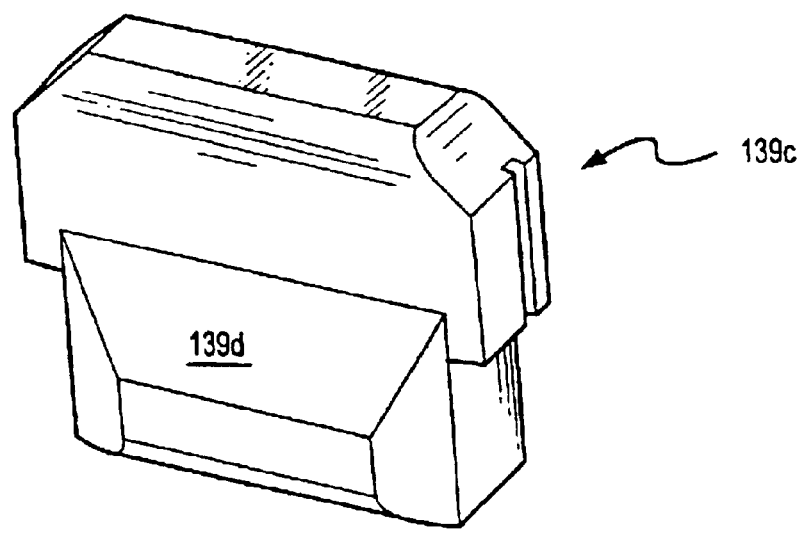
Figure 5:
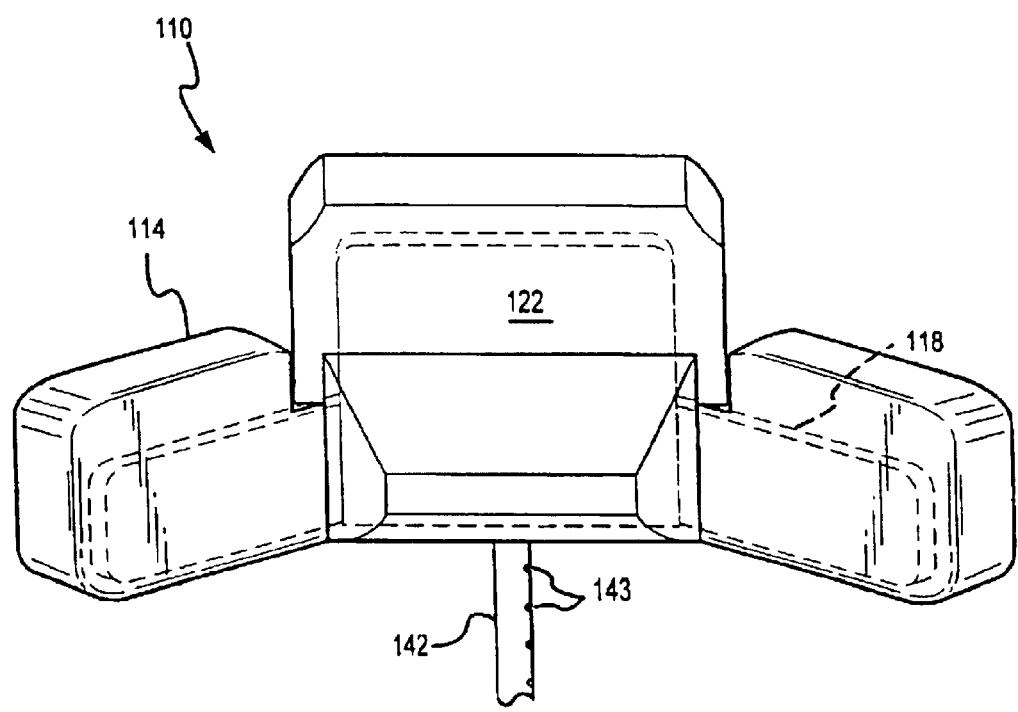
FIG. 5 is an embodiment of the headrest of the present invention.

In the embodiment illustrated in FIGS. 3–4, the interconnecting member comprises one or more stems or rods attached to the base of the back member 135c. In this regard, the headrest may replace existing removable headrests in automobile seats or other similar type seats. Such stems or rods 142 may comprise a metallic material such as steel, to adequately support a head during rear-end collisions (e.g., for automobile applications) and while the user is at rest. Such rods 142 may also include a plurality of notches to provide height adjustability of the back member relative to an automobile seat interconnected thereto, since such automobile seats typically include a channel or tube for receiving such rods 142 and a height adjustment mechanism operatively mounted with such notches 143. In an alternative embodiment, the headrest may instead include a strap for securing the headrest to a seat or headrest portion of an existing seat. Such a strap is positionable adjacent to the hinge axes defined by the first and second hinges 136a, 136b and may be looped through slots in the back member 136c, substantially as described hereinabove with respect to the embodiment of the headrest illustrated in FIGS. 1–2. In the illustrated embodiment, the back member 136c includes insert areas which allow the strap to be positioned close to the hinges, such that the mounting strap is located largely along or about the hinge axis. Such insert area enhances stability. The headrest may further include a releasable locking mechanism (e.g., a tab on the hinge) for locking the first and/or second wing members in at least one of various positional orientations relative to the back member 135c.

Figure 17A:
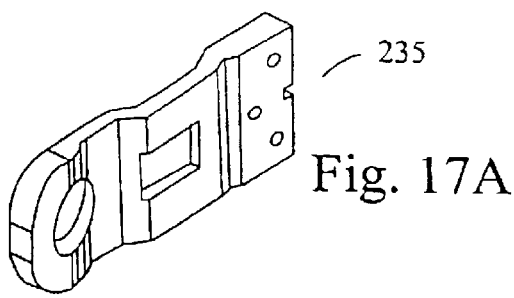
FIGS. 17A–17B illustrate still another embodiment of the wing members of the present invention.
Figure 17B:
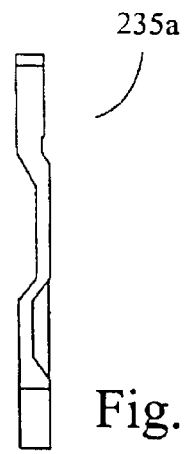
Figure 18:
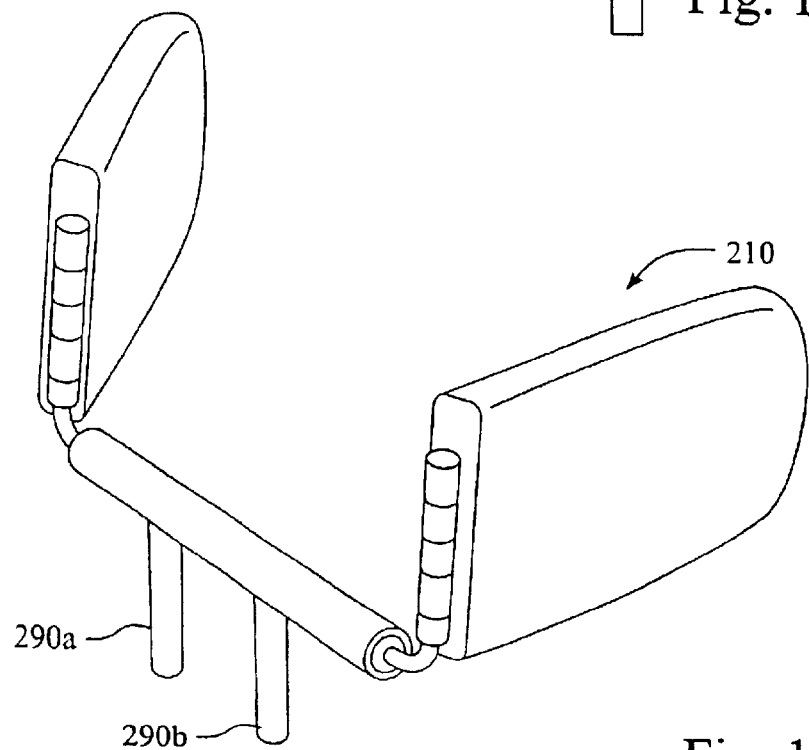
FIG. 18 illustrates another embodiment of the headrest of the present invention, with the interconnecting members being stems.

FIGS. 6–18 illustrate additional embodiments of the headrest of the present invention. Referring to FIGS. 6, 7, 8A–8C, 13 and 14, in one embodiment, the headrest 210 of the present invention generally includes a frame 220, padding covering portions of the frame 220 which engage side portions of a person's head and a neck portion of the person, and an interconnecting member for securing or interconnecting the portable headrest to a seatback. More specifically, the headrest 210 includes first and second wings 214, 218 for supportably engaging side portions of a person's head, especially when the person is seated, and a neck portion 224 capable of abuttingly or supportably engaging a portion of the neck of a person. In particular, the frame includes a rigid neck support member 230 which extends between and interconnects first and second rigid wing members 235a, 235b at first and second vertically extending end portions 238a, 238b of the frame which are integrally formed with the neck support member 230. In order to secure the portable headrest 210 to an upper portion of a seatback, the headrest 210 further includes a first strap 226 which is loopable through first and second swivels 270a, 270b, which correspond to the hinge axes about which the first and second wings 214, 218 are pivotally moveable relative to the neck support member 224. Advantageously, movement of the wing members 214, 218 is accomplished independently of the first strap 226, such that loosening of the first strap 226 is not required to move the wing members 214, 218 to the desired pivot positions. Such swivels 270a, 270b are interconnectable to the first and second hinges 234a, 234b, respectively. As with previous embodiments, the first strap may include a releasable fastener, such as a snap, clasp, or Velcro in order to secure the first strap 226 around an upper portion of the seatback to releaseably secure the portable headrest 210 thereto. Alternatively, and as illustrated in FIG. 18, the headrest 210 may include first and second stems 290a, 290b which are receivable within channels of the seatback (not shown) to interconnect the portable headrest 210 to a seatback, substantially as described hereinabove in relation to other embodiments.

As in previous embodiments, the wings 214, 218 are angularly adjustable to accommodate varying positions of comfort for the user. In this embodiment, and as noted hereinabove, the wing members 235a, 235b are pivotally interconnected to the first and second end portions 238a, 238b via first and second hinge mechanisms 234a, 234b. In this embodiment, and as discussed hereinabove with regard to other embodiments, such hinge mechanisms may comprise torsion springs. In addition, in order to inhibit injury to a person's head, especially during severe deceleration or in the event of a collision, rotation stops 280a, 280b may be utilized to prevent the wing members 235a, 235b from rotating more than a desired angular orientation (e.g., 70° relative to the neck support member). Such rotation stops may be knurled press fittings which are interconnectable to the first and second end portions 238a, 238b.

Of importance, the headrest 210 of the present invention utilizes the neck portion 224 to support a neck of a person (as opposed to a backside of a person's head). In one embodiment, the neck portion 224 includes the center member 230 and a pad 250 positioned thereover to provide comfort to the user. In this embodiment, the neck portion is substantially positioned co-planar with lower surfaces 215a, 219a of the wings 214, 218, respectively. In other embodiments, the neck portion 224 is positionable below such lower surfaces 215a, 219a of the first and second wing 214, 218, respectively. As such, the backside of a person's head may be abuttingly engageable with the existing upper or headrest portion of the seatback. In this regard, the portable headrest 210 of the present invention may accommodate late model vehicles which typically position a headrest or upper portion of a seatback forward or proximal the back support portion of the seatback in order to minimize whiplash injuries. The present invention may also accommodate older model cars which do not employ forwardly positioned headrest portions of seatbacks by providing a first pad member 260 having a releaseable fastener such as Velcro to releaseably secure the first pad member 260 to the seatback itself or to the strap 226. Such pad member 260 may include foam, or alternatively, be inflatable to provide to the user adjustability in cushioning.

Figure 9:
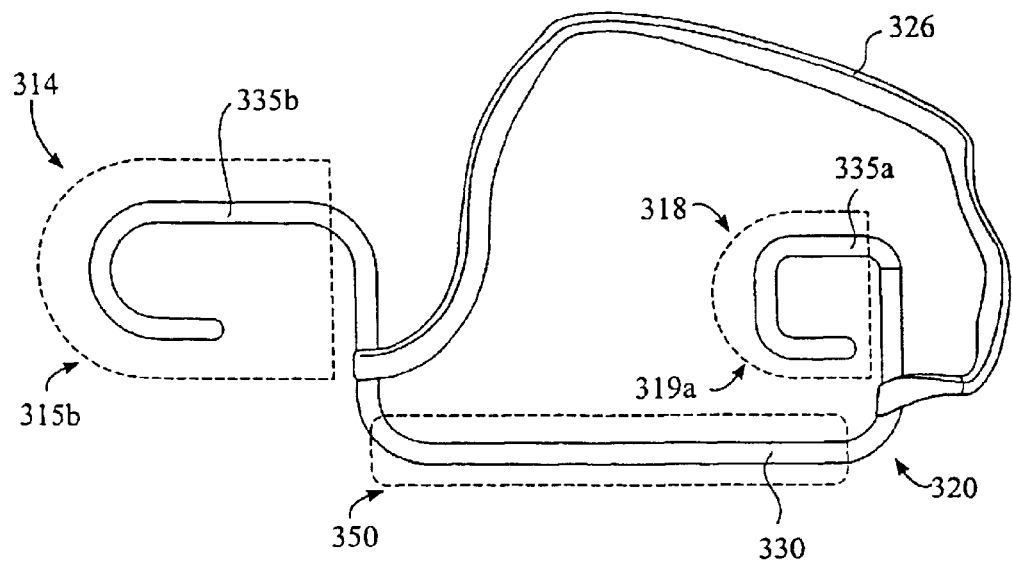
FIG. 9 is a perspective view of another embodiment of the headrest of the present invention, illustrating the unibody frame.
Figure 10:
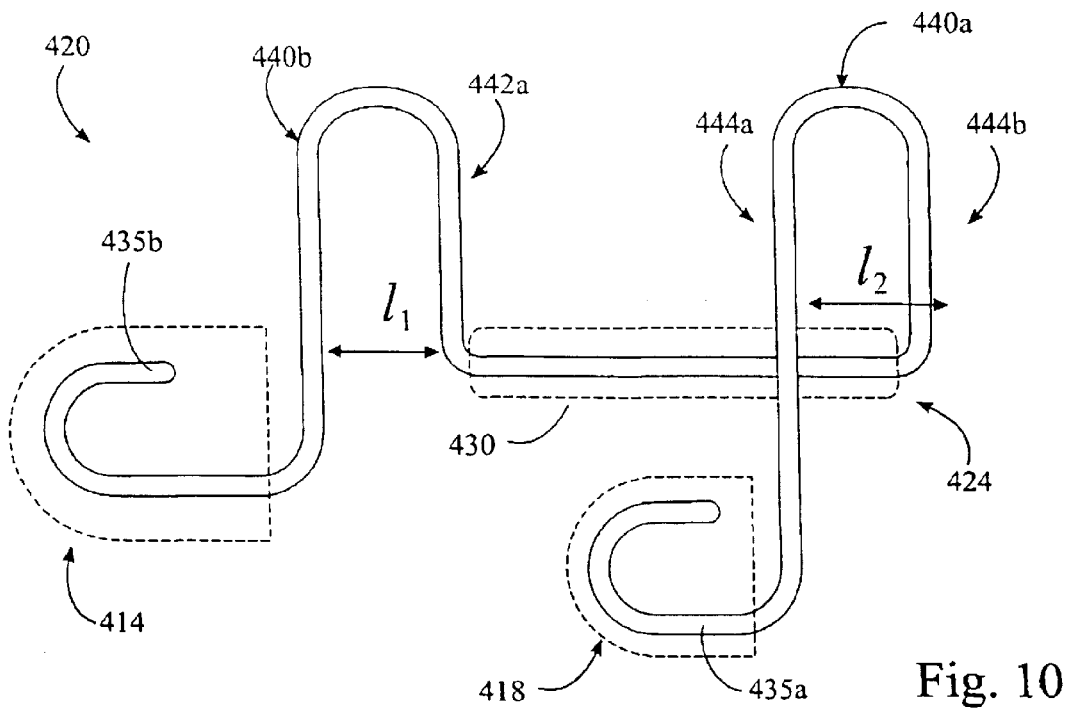
FIG. 10 is a perspective view of still another embodiment of the unibody frame of the headrest of the present invention, illustrating the center member positioned distal relative to the wing portions of the frame to clamp over an upper portion of a seatback.

FIGS. 9 and 10 of the present application illustrate alternative embodiments of the frame of the portable headrest of the present invention. In one embodiment, the frame 320 is a unibody frame in which the center neck support member member 330 is integrally formed with the first and second wing members or portions 335a, 335b to form a unibody frame 320. In this embodiment, the frame 320 comprises a tube fabricated from a metal, such as aluminum, or a hard plastic. The first and second wing members 335a, 335b are angularly fixed relative 320 to the center neck support member 330 at various angular positions desirable for a user to rest their head. As with the above-described embodiment, the center neck support member 330 is positionable at or below a plane defined by the first and second lower surfaces 315a, 319a of the first and second wings 314, 318, respectively, in order to supportably engage the neck portion of a person. In order to provide comfort to the user, the center neck support member 330 includes a pad 350. In an alternative embodiment, the wing portions 335a, 335b are releaseably securable to the center neck support member 330 via appropriate fasteners (e.g., threaded rod, male/female snap/fitting, twist-on attachment, etc.) in order to enhance portability and storability of the headrest. A first strap 326 is used in this embodiment to releaseably secure the portable headrest to an upper portion of a seatback.

Figure 11:
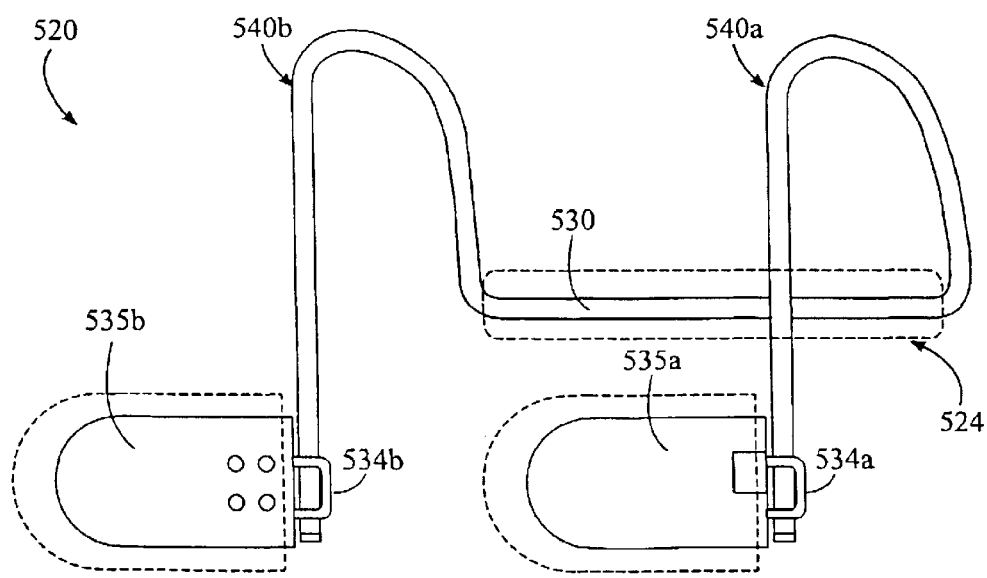
FIG. 11 is a perspective view of another embodiment of the frame of the headrest of the present invention with wing portions being hingedly connected to the frame which is releasably securable to an upper portion of a seatback.
Figure 12:
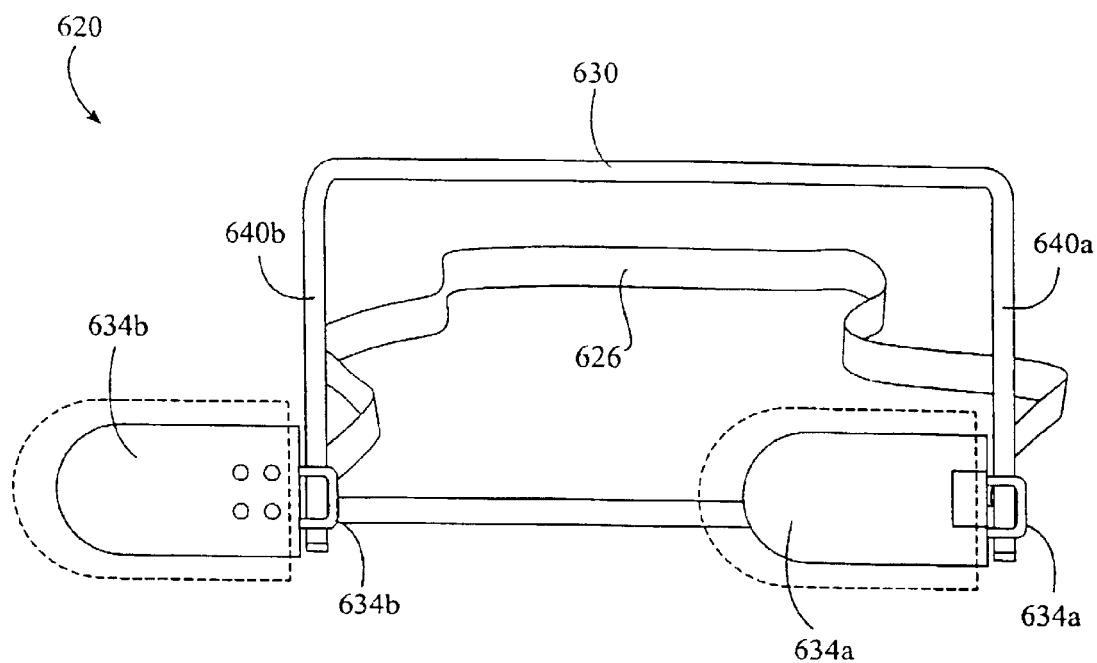
FIG. 12 is a perspective view of another embodiment of the frame of the headrest of the present invention, illustrating the center portion of the frame being positionable on a top portion of a seatback and the wing portions being hingedly connected to end portions of the center portion.
Figure 13:
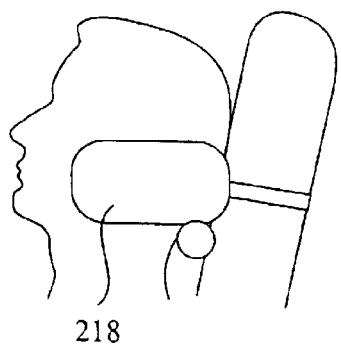
FIG. 13 is a side view of the headrest of FIG. 6 mounted onto an upper portion of a seat, illustrating a person's head being supported thereon.
Figure 14:
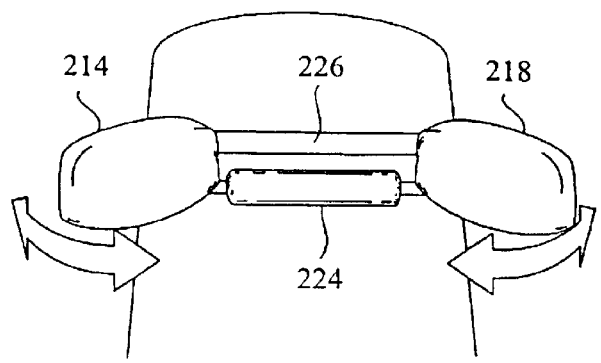
FIG. 14 is a front view of the headrest of FIG. 6 mounted onto an upper portion of a seat.

In another embodiment, illustrated in FIG. 10, the portable headrest of the present invention is designed to be releaseably securable to an upper portion or headrest portion of the seatback without the use of straps or other similar devices. In this embodiment, the headrest includes a frame 420 having a center member 430 which extends between and interconnects first and second wing members 435a, 435b via first and second intermediate portions 440a, 440b, which are generally U-shaped in configuration. Of importance in this embodiment, the center member 430 is positioned distal or behind the first and second wing members 435a, 435b such that the center member 430 is engageable with a backside of the seatback, in the upper portion or headrest portion of the seatback. In order to adequately secure this embodiment of the headrest of the present invention to an upper or headrest portion of a seatback, especially during use, the first and second intermediate portions 440a, 440b are designed to allow the frame 420 to compressively engage or pinch the upper portion of the seatback. In this regard, the first and second legs 442a, 442b and 444a, 444b are spaced apart a distance $l_1$, $l_2$, respectively, which is less than the distance between front and back surfaces of a portion of the headrest or upper portion of the seatback (e.g., proximate the center member 430). FIG. 11 illustrates an alternative embodiment of the frame illustrated in FIG. 10, showing the wing members 535a, 535b being hingedly or pivotally interconnected to end portions of the intermediate portions 540a, 540b of the frame 520. In this embodiment, the hinge mechanisms utilized to provide angular adjustability of the wing members 535a, 535b relative to the center member 530 include torsion springs 534a, 534b. In still another embodiment, illustrated in FIG. 12, the frame 620 of the headrest of the present invention includes a center member 630 which is co-planar with hinge axes defined by the hinges 634a, 634b which hingedly interconnect the wing members 634a, 634b, respectively, to the center member 630 via first and second intermediate portions 640a, 640b. The headrest further includes strap 626 loopable around the intermediate portions 640a, 640b proximate the hinges 634a, 634b.

Figure 6:
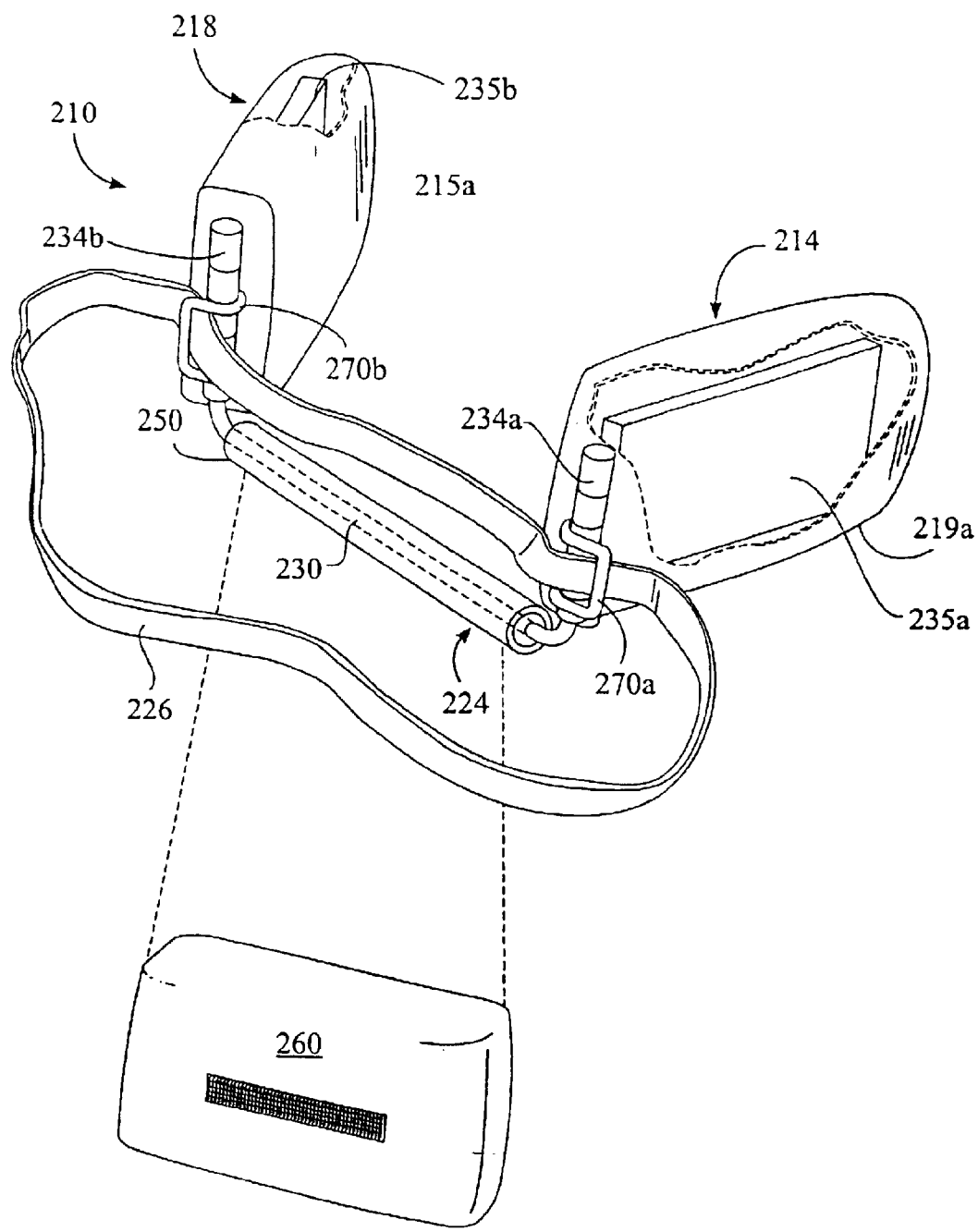
FIG. 6 is a perspective view of the portable headrest of the present invention.
Figure 15A:
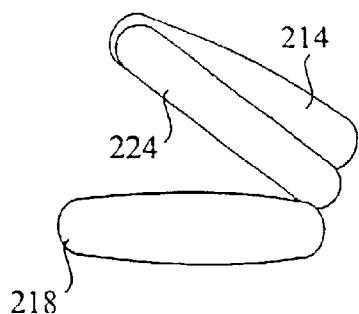
FIGS. 15A–15E illustrate the headrest of FIG. 6 utilized in various configurations, without use of the interconnecting member.
Figure 15B:
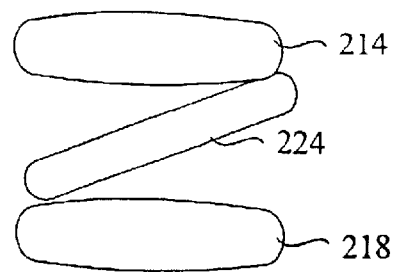
Figure 15C:
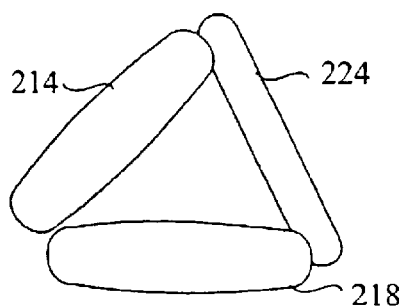
Figure 15D:
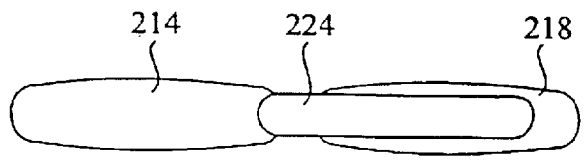
Figure 15E:
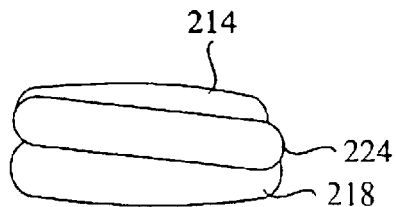

FIGS. 15A–15E illustrate various configurations in which the headrest illustrated in FIG. 6 may be utilized. For example, and referring to FIG. 15A, the headrest 210 may be configured and/or oriented to the illustrated configuration, such that the headrest 210 may be utilized between a person's head and shoulder to support the person's head (e.g., whereby the wing member 218 abuttingly engages a person's shoulder and the side of a person's head is supported by wing member 214). FIG. 15B illustrates another alternative configuration of the headrest 210, whereby the headrest 210 in this "Z-shaped" configuration may be placed between a person's head and a window of the vehicle (e.g., airplane window, train window, automobile window, etc.) to support a person's head. FIG. 15C illustrates yet another configuration of the headrest 210, whereby wing member 214 may support a person's head, wing member 218 abuttingly engage a person's shoulder, and neck support member 224 may abuttingly engage the window of a vehicle. FIG. 15D illustrates still another configuration in which the headrest 210 may be utilized to support a person's head. In this configuration, the wing member 218 and neck support member 224 may be positioned between adjacent seats (e.g., on the train or airplane), such that the headrest 210 is wedged therebetween, and a person's head is supportable by wing member 214. Finally, FIG. 15E illustrates a folded configuration of headrest 210, such that the headrest 210 is storable in a small, compact arrangement. In this regard, in order to achieve such configurations, the torsion springs interconnecting the wing members to the neck support members may allow 360° rotation.

Figure 16A:
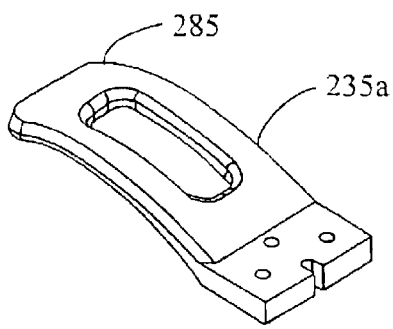
FIGS. 16A–16B illustrate another embodiment of the wing members of the present invention.
Figure 16B:
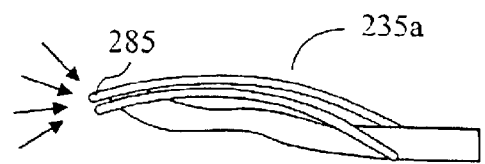

In another embodiment, the wing members are designed to avoid injuring the person utilizing the headrest of the present invention. In one embodiment, the middle portion of the wing member is transverse or offset relative to the end portions or segments of the wing member to facilitate buckling of the wing member when subject to a compressive load (e.g., applied to the end of the wing member). FIGS. 16A–16B and FIGS. 17A–17B illustrate first and second rigid wing members 235a, 235b which provide additional safety to the user. Referring to FIGS. 16A–16B, a curved or scooped wing member is provided to enhance safety. More specifically, the end portion 285 of the wing member 235a is "off-axis," such that in the event of sudden deceleration or a collision, the forces generated thereby would provide a moment outside of the hinge attached to the wing member 235a, which would cause the wing member 235a to swing away and/or buckle. FIGS. 17A–17B illustrate a collapsible wing member 235a which is designed to buckle or bend in the event a person's head impacts the wing member. In this regard, the wing member 235a would act as a crush zone and would plastically yield but not permanently deform. As such, the wing members may be fabricated from a plastic material, such as polyethylene.

Figure 19A:
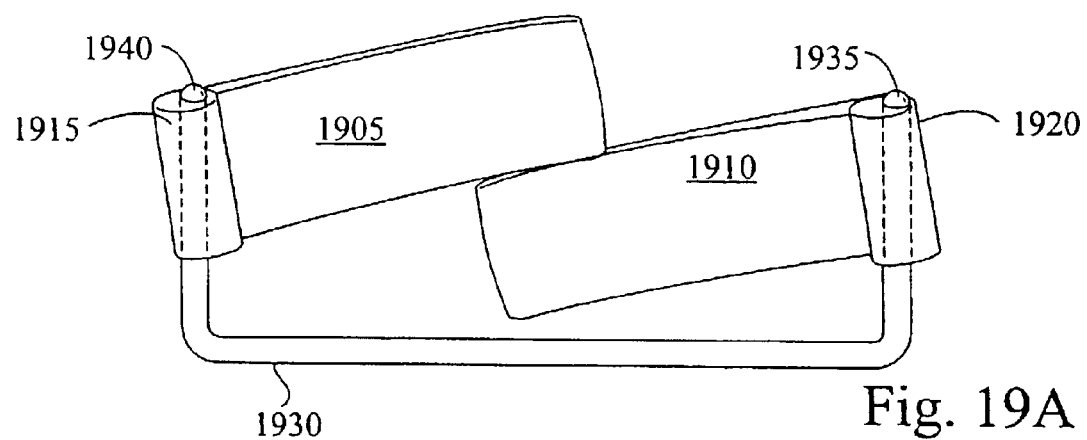
FIGS. 19a and 19b illustrate an embodiment having angularly folding wing members.
Figure 19B:
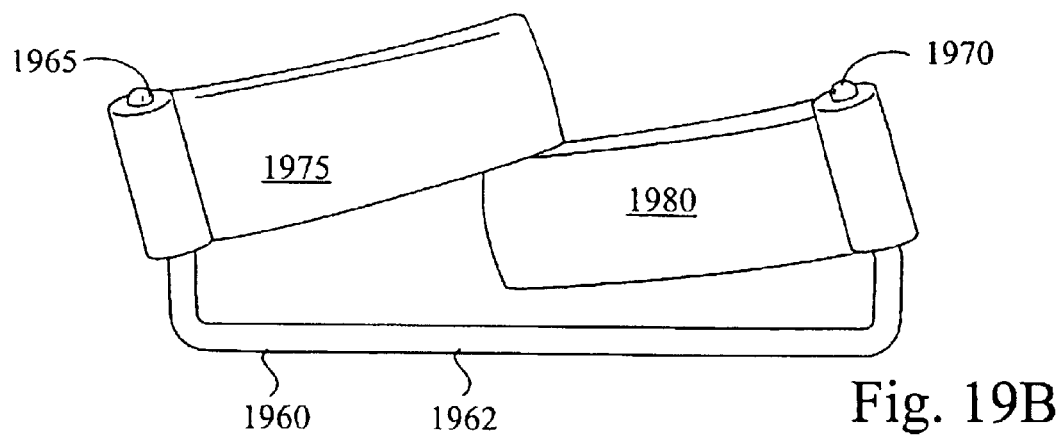

FIGS. 19a and 19b illustrate other embodiments of a winged headrest. The embodiments of FIGS. 19a and 19b illustrate a headrest having angularly folding wing members. The wing members are hinged in a manner such that they rotate slightly eccentrically, closing inwardly to a folded position with one wing member above the other wing member, resulting in a more compact storage position. As can be seen in FIG. 19a, wing member 1905 folds above wing member 1910 when the wing members are folded inwardly to the closed or folded position.

In the embodiment of FIG. 19a, the wing member has a bore that is aligned to cause this angular motion when the wing is folded inwardly. In particular, the bore 1915 is angled inwardly away from the back edge of the wing 1905 to cause the wing 1905 to rotate slightly upwardly when rotated inwardly toward the central support bar 1930. Similarly, a bore 1920 is angled outwardly towards the back edge of the wing 1910, causing the wing 1910 to rotate slightly downwardly when rotated inwardly toward the central support bar 1930. Other embodiments may have variously shaped wings and the geometric positions or angles may differ. The angle used may be a function of the length of the central support bar, the size of the wings, the thickness of any wing padding, the expected angle during use, etc.

When rotated outwardly to a selected usage angle, the wings 1905 and 1910 return to an angle where their bottom surfaces are approximately planar to each other. Throughout the range of motion in which a user is likely to use the wings for head support (e.g., approximately seventy to one hundred ten degrees from the folded position), the wing orientation changes only slightly so that the wing bottoms remain approximately planar with respect to each other. For example, the headrest may be designed such that a seven degree angle is sufficient to cause the wings to rest above and below each other in the folded position, but the wing bottoms align when folded outwardly approximately one hundred degrees from the folded position.

In the embodiment of FIG. 19a, a vertically extending end portion 1940 is received by a bore 1915. The bore 1915 is slightly too small relative to the end portion 1940. Thus, the wing 1905 is press fit onto the vertically extending end portion 1940 to provide a friction hinge. Similarly, on the other side, a second vertically extending end portion 1935 is received by a second bore 1920, which is also slightly undersized. The wing 1910 is press fit onto the end portion 1935 to form a friction hinge structure. Each friction hinge is capable of supporting the weight of a human head leaning against the wing and yielding to allow the wing to rotate about the hinge axis when a greater force is applied. In one embodiment, the hinge formed by the bore 1915 and the end portion 1940 maintains the wing position until a torque of between fifteen and thirty-five inch pounds is applied.

The embodiment of FIG. 19b similarly provides overlapping wings 1975 and 1980 in the folded position. Again, these wings fold out to a relatively planar position when in the range of motion expected with typical usage. The embodiment of FIG. 19b differs, however, from the embodiment of FIG. 19a in that the vertically extending end potions 1965 and 1970 are bent at an angle off from perpendicular to a central support bar 1960, rather than the bores being angled with respect to the wing members.

Figure 20A:
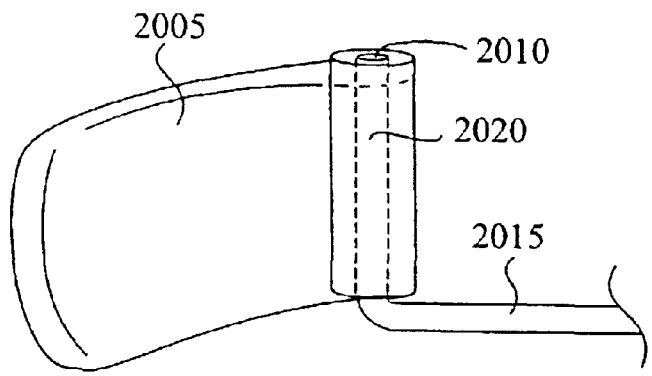
FIG. 20a illustrates one embodiment having a press-fit hinge mechanism.

FIG. 20a illustrates one embodiment of a press-fit hinge mechanism which may be used with a variety of the winged headrests disclosed. Of course, as with other embodiments of the invention, any type of hinge that has friction over a range of motion sufficient to support the weight of a human head leaning against a hinged wing, yet which is adjustable by applying a greater force may be used. Various other design or application-related considerations (e.g., materials to use, having split or single hinge members, size, weight, integration into a seat, etc.) may motivate one of skill in the art to make modifications or substitutions falling within the scope of invention. In the embodiment of FIG. 20a, a support member 2015 supports a wing member 2005 hingedly attached to an end portion 2020 that extends vertically upward from the support member 2015. In some embodiments, the end portion may vary from being perpendicular to the support member 2015. Both the support member and the end portion may vary in shape (being curved, bent, angled, or otherwise shaped) for structural, ergonomic, cost, or other reasons.

Another wing (not shown) may be provided, or a one-sided headrest may be implemented in some embodiments. The wing member 2005 includes an end portion which is sufficiently wide to accommodate a bore 2010. The bore 2010 may be formed in an integral portion of the wing (which may be a cost effective solution) or may be formed in a part of a separate component attached to the wing member. The bore 2010 is formed slightly smaller than the end portion 2020. The wing 2005 is pressed into place over the end portion 2020, forming a snug fit, which allows rotation of the wing member, but yet provides a sufficient degree of friction to support the weight of a human head leaning against the wing 2005. The amount of friction should also be small enough to allow a user to move the wing 2005 by applying a greater force than just the weight of a head leaning against the wing. For example a torque of between fifteen inch pounds and thirty inch pounds may be an appropriate level at which the wing friction is overcome.

Many alternative embodiments of press-fit hinges may be used as will be apparent to one of skill in the art. The materials of the end portion 2020 and/or the wing 2005, or the portion of the wing 2005 which houses the bore 2010 may be altered, for example. Thus, a different bore to end portion size differential may be required depending on the various characteristics of the materials (malleability, compressibility, surface coefficients of friction, lubricants used, hoop stress, creep stress, coefficients of thermal expansion, etc.).

Figure 20B:
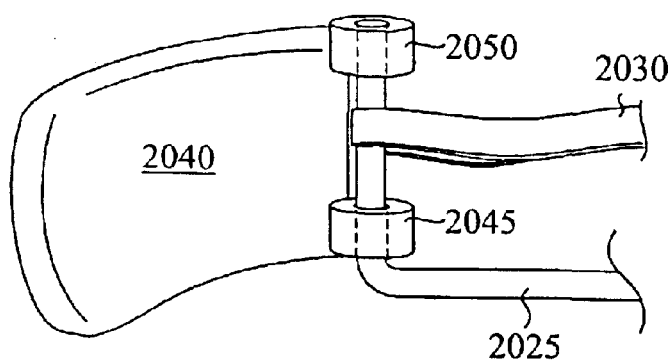
FIG. 20b illustrates one embodiment having a press-fit hinge mechanism with an upper portion and a lower portion and a gap through which a strap may be threaded to secure the headrest to a seat or other object.

Another alternative embodiment for a hinge that may be used with a variety of headrests is shown in FIG. 20b. The embodiment of FIG. 20b includes a wing member 2040 hingedly attached to an end portion of a support member 2025 by a press-fit hinge mechanism. The press fit hinge mechanism in this embodiment is a friction hinge having an upper portion 2050, a lower portion 2045 and a gap between the upper portion 2050 and the lower portion 2045 in which a strap 2030 may be positioned to secure the headrest to a seat or other object. Press-fit hinge portions or other types of hinges may be used to provide a split or multi-hinge arrangement.

Although the embodiment of FIG. 20b illustrates a single gap between upper and lower portions of the hinge mechanism, other embodiments may use other arrangements. For example, one embodiment may include multiple straps positioned between discrete or attached hinge portions which allow gaps for the straps. Another embodiment may utilize a single hinge portion (which may be larger than the single upper portion shown in FIG. 20b) and then have a strap seat or guide (e.g., a horizontally aligned indentation in the vertically extending end portion of the support member) to help hold the strap in place when the headrest is strapped in place. Two strap guides, one on each side of the headrest assembly, may be provided in the case of a two wing headrest.

Figure 21A:
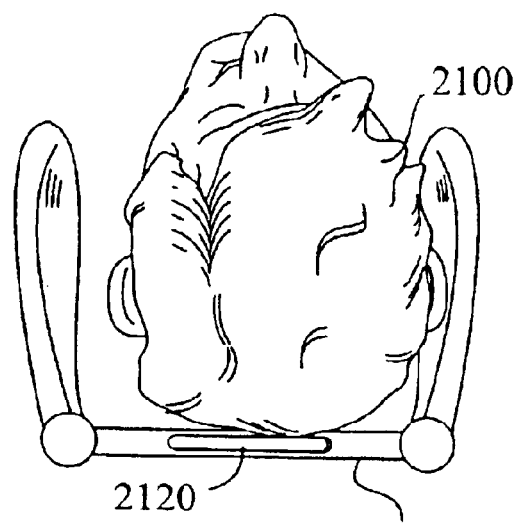
FIG. 21a illustrates one embodiment having a center bar with a hollow yielding portion.

FIG. 21a illustrates one embodiment of a center bar 2110 having a hollow yielding portion. The center portion may yield in that it may actually break or it may temporarily or permanently deform in response to an impact. In the embodiment of FIG. 21a, the center bar 2110 includes a cavity or aperture 2120. The aperture 2120 may simply be a hollowed out portion within a tubular center member. The aperture may be elliptically shaped, and may be positioned slightly forward of the center of the bar member. As a result, when a head 2100 impacts the center bar 2110 with a large amount of force, as may be expected in a vehicle crash, the bar is likely to deform bending backwardly to a shape similar to that shown in FIG. 21b. In one embodiment, the tube deforms at a force of greater than forty pounds per square inch and breaks at a force of greater than sixty pounds per square inch. In other embodiments, different yielding center portions may be formed using a uniformly hollow center bar or other techniques, including making a solid center bar of a material with the desired yielding and/or deformation properties. For example, an acrylonitrile-butadiene-styrene (ABS) injected molded tubular center bar of approximately three-eighths to one-quarter inch in diameter. Additionally, the center bar may be tapered such that it is narrower in the middle and wider near the wing(s).

Figure 21B:
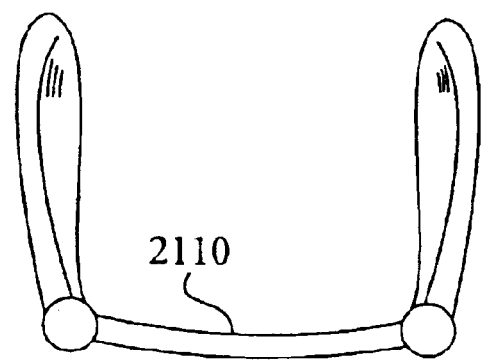
FIG. 21b illustrates one embodiment having a curved center bar.

FIG. 21b illustrates one embodiment of a curved center bar. As previously noted, a curved center bar may be the result of a deformation due to an impact. However, a curved center bar 2110 may also be a desirable ergonomic feature. The curved center bar 2110 may be constructed with an arc radius (e.g., ten to twenty inches) such that the center bar 2110 matches the contour a typical seat headrest. As such, the curvature provides several benefits. First, the curvature may compensate for a typical headrest shape (both the horizontal curvature and the vertical curvature typically found in headrests). Additionally, the curved center bar 2110 forms an arc to strongly withstand the torque caused by rotation of the wings, yet is relatively weak and capable of yielding upon impact from a head.

Figure 22:
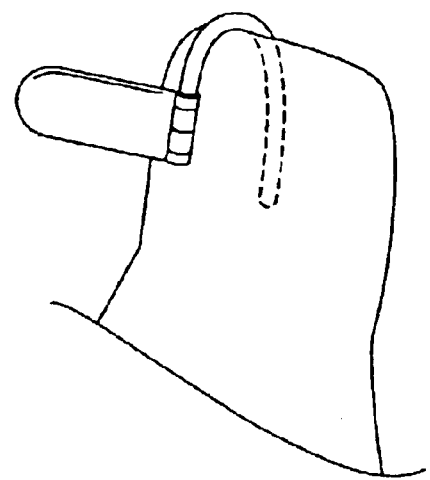
FIG. 22 illustrates one embodiment of a one-sided headrest with an over-the-seat, compressive attachment member.

FIG. 22 illustrates an alternative headrest arrangement. The headrest of FIG. 22 is one embodiment of a one-sided headrest with an over-the-seat, compressive attachment member. The embodiment of FIG. 22 includes a wing portion 2200 which is attached by a hinge mechanism 2210 to an attachment member 2220. The attachment member 2220 is securable to a headrest of a seat (e.g., an airplane seat, a car seat, a train seat, etc.) by means of compression. For example, the attachment member 2220 may be a metal U-shaped member that has a smaller U opening than the expected seat headrest width, or an adjustable compressive member. Thus, when pressed downwardly over the seat headrest, the embodiment of FIG. 22 is held in place by compression. Various different structures may be used to compressively attach to a seat or seat headrest. For example, the U shaped member may be used to slide onto the seat sideways. Alternatively, multiple compressive members may be used to ensure that the winged headrest is held in place. Moreover, other materials may be used, so long as they provide some flexibility and resilience.

The hinge mechanism 2210 may be a torsion or friction hinge as previously described. That is, the hinge mechanism 2210 may itself provide friction to hold the wing mechanism in place. In some embodiments, the hinge mechanism 2210 may provide sufficient friction to support the weight of a human head leaning against the wing portion 2200 in variety of positions, yet may be manually moveable when it is desired that the wing position be changed.

Figure 23A:
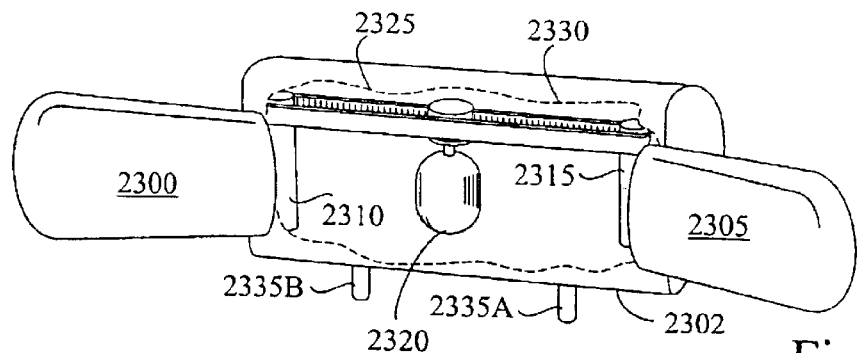
FIG. 23a illustrates one embodiment of a motorized headrest.

More elaborate headrests may also benefit from the use of a wing which without user assistance maintains its position. For example, FIG. 23*a* illustrates one embodiment of a headrest 2302 with motorized wing members 2300 and 2305. The headrest of FIG. 23*a* includes a single motor 2320 which can drive wing members 2300 and 2305 by respectively belts 2325 and 2330. Other conventional or otherwise available driving mechanisms may be used such as various gearing, direct-drive, and/or belt mechanisms. The belts 2325 and 2330 drive respectively hinge mechanisms 2310 and 2315.

The wing members 2300 and 2305 may be held in place in several manners. In one embodiment, the hinge mechanisms 2310 and 2315 are friction or torsion hinges as previously described and therefore have friction to help maintain the wings in a user-selected position. The user actuates an electronic control to move both wing members forward or backward, the motor 2320 having sufficient torque to overcome the resistance of the hinging mechanisms. Gearing or other torque increasing means may be used to allow the motor 2320 to drive the wing members. Alternatively, the motor 2320 itself may have sufficient rotational resistance such that the motor itself holds the wing members in place. Alternatively, a combination of hinge and motor resistance may be used to maintain the wing members in position.

The headrest of FIG. 23*a* may be attached to a lower portion of a seat by stems 2335*a* and 2335*b*. Such an embodiment may be useful in a car or other motorized vehicle having pre-existing seats adapted to receive such stems. Alternatively, the headrest portion may be integrally formed with a lower portion of the seat (e.g., forming a part of a seat as is common in some cars, airplanes, etc.).

Figure 23B:
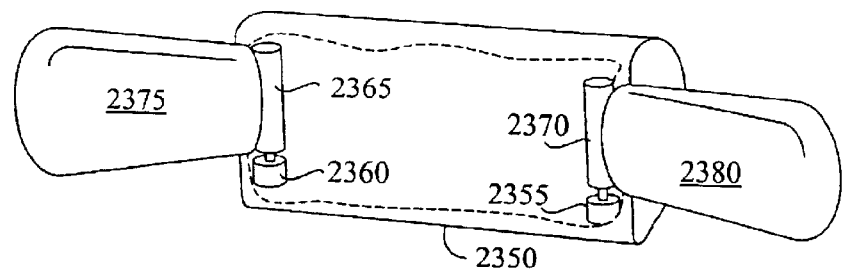
FIG. 23b illustrates another embodiment of a motorized headrest.

FIG. 23*b* illustrates another embodiment of a motorized winged headrest. In the embodiment of FIG. 23*b*, two motors 2360 and 2355 may be used to separately drive hinge mechanisms 2365 and 2370 thereby moving respectively wing members 2375 and 2380. Again, the position of the wing members may be maintained in a variety of manners as described with respect to FIG. 23*a*. Additionally, however, the wing members may be actuated by a user independently of each other in the embodiment of FIG. 23*b*.

Figures 23C, 23D:
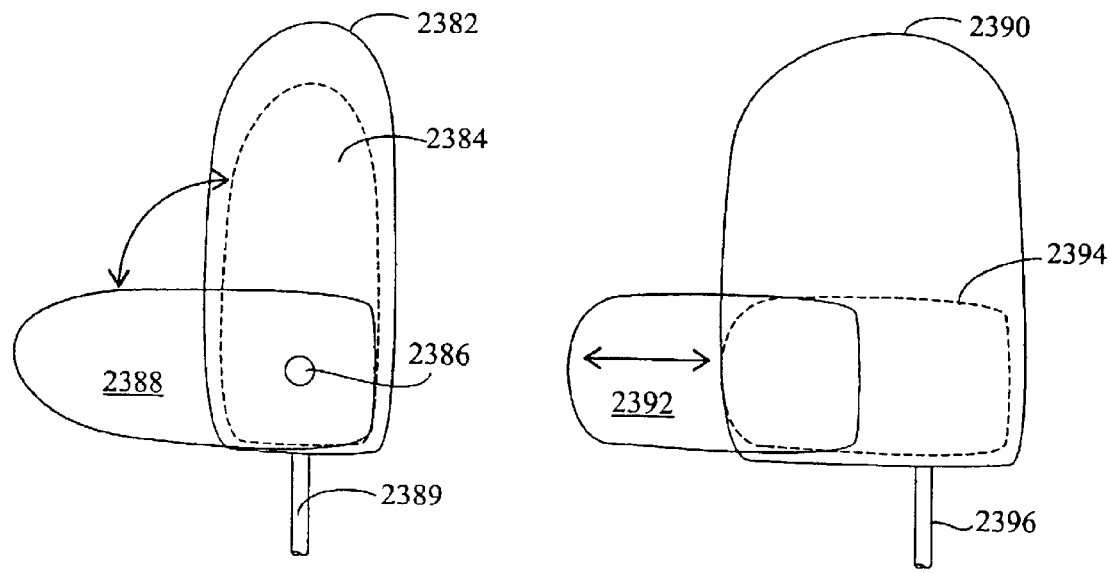
FIG. 23c illustrates one embodiment having a wing stowing capability.
FIG. 23d illustrates another embodiment having a wing stowing capability.

Additionally, stowing the wings of a motorized headrest may be desirable in environments such as vehicles. FIG. 23*c* illustrates one embodiment having a wing stowing capability. This embodiment may be useful with motorized headrests such as those shown in FIGS. 23*a* and 23*b*; however, such stowable wing members may be used in other embodiments lacking motors. In the embodiment of FIG. 23*c*, a headrest 2382 includes an indented portion generally indicated by 2384. A wing member 2388 may be in the downward position as shown by the dashed line, or may be pivoted upwards on pivot point 2386 to an upward stowed position. Notably, some embodiments may simply stow the wing members by rotating them upwardly, the indentation to make the wing member flush with the headrest profile being optional. The headrest may also include one or more stems such as stem 2389 for attaching to a lower portion of a seat.

Another embodiment having stowable wing members is shown in FIG. 23*d*. In the embodiment of FIG. 23*d*, a headrest 2390 includes a stem 2396 and an indented portion 2394 indicated by the dashed line. In one embodiment, a wing member 2394 telescopes backwards on a telescoping assembly. Various telescoping mechanisms may be used. For example, a telescoping rod arrangement may be used, as may other known or otherwise available telescoping mechanisms as may be appropriate for a particular design. In another embodiment, the wing member 2392 may fold backward by rotating about the hinge axis for stowing in the indented portion 2394. Some embodiments may not have an indentation and may stow the wing member merely by rotating it backwards, with the wing member not lying flush with the headrest.

Figure 24A:
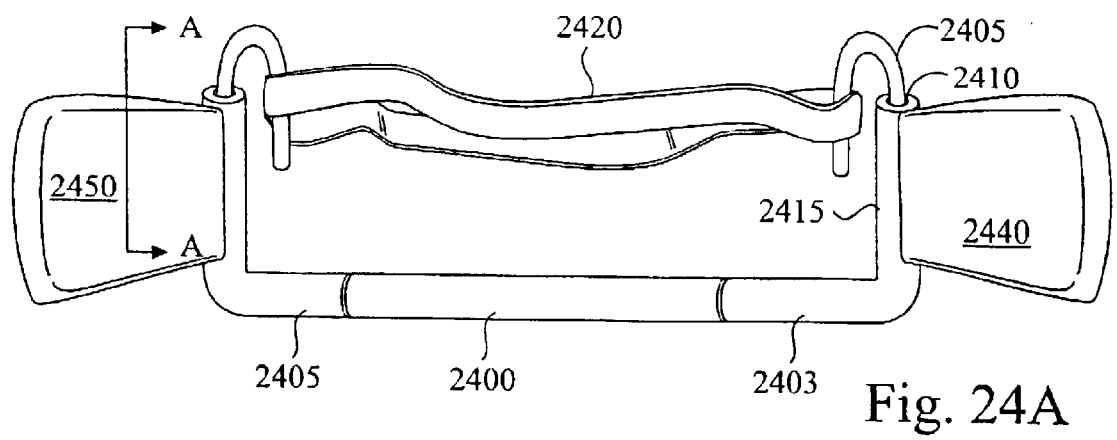
FIG. 24a illustrates an embodiment having a slide-on strap attachment member.
Figure 24B:
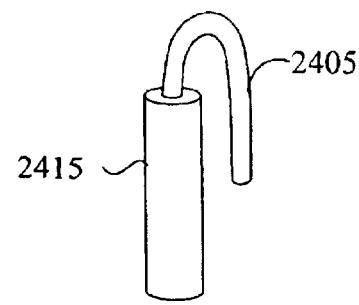

FIGS. 24*a* and 24*b* illustrate embodiments having slide-on strap attachment members. For a higher degree of ease of use for some consumers, it may be desirable to simplify the procedure of attaching the winged headrest to a seat. One manner in which this may be accomplished is by allowing the strap to be attached to the seat independently of the actual support or center bar, the wings and the hinge. Thus, the user is left only with the straightforward task of attaching a simple strap to an existing seat headrest, and thereafter sliding the assembly over the strap.

For example, in the embodiment of FIG. 24*a*, the headrest assembly is easily separable from an accompanying strap 2420. The headrest assembly includes a support member having support member portions 2400, 2403, 2405 and wing members 2440 and 2450. The support member includes a vertically extending end portion 2415, having a bore 2410, into which a strap attachment member 2405 may be inserted. For example, the strap attachment member 2405 may be press-fit into the bore 2410. The strap attachment member 2405 extends outwardly (e.g., backward with respect to the front of the winged headrest) and then downwardly parallel to the vertically extending end portion 2415 as may be also seen from the side view of FIG. 24*b*.

The bottom of the strap attachment member 2405 is spaced slightly from the vertically extending end portion 2415 to provide a slot that can accept the strap 2420. Thus, a user may first fasten the strap to the seat (various clasps, Velcro, or other conventional means may be used to secure the strap). The user may then simply slide the headrest assembly downward over the strap such that the strap attachment members engage the secured strap and therefore hold the headrest assembly in place.

FIG. 24*a* also illustrates a multiple material support member. The support member includes a center portion 2400 and two outer portions 2403 and 2405. In one embodiment, the center portion 2400 is a softer more flexible material, (e.g., a plastic such as injection molded ABS, polychlorinated biphenyl (PCB), nylon 6—6, etc.) and the outer portions are more rigid materials such as stainless steel or a hardened plastic. Such an arrangement may advantageously provide a sufficiently rigid structure to allow a user to move the wings when strapped to the seat, and additionally provide a yielding center portion. In one embodiment, the strap attachment members of FIG. 24*a* may be omitted and the strap looped over the vertically extending end portions. In this embodiment, it may be advantageous to provide vertically extending end portions having a height of at least the strap width greater than the wing height (e.g., see FIG. 28), so there is sufficient space to strap the headrest assembly to the seat. Additionally, strap guides indented into the vertically extending end portions may be helpful in this embodiment.

Figure 25:
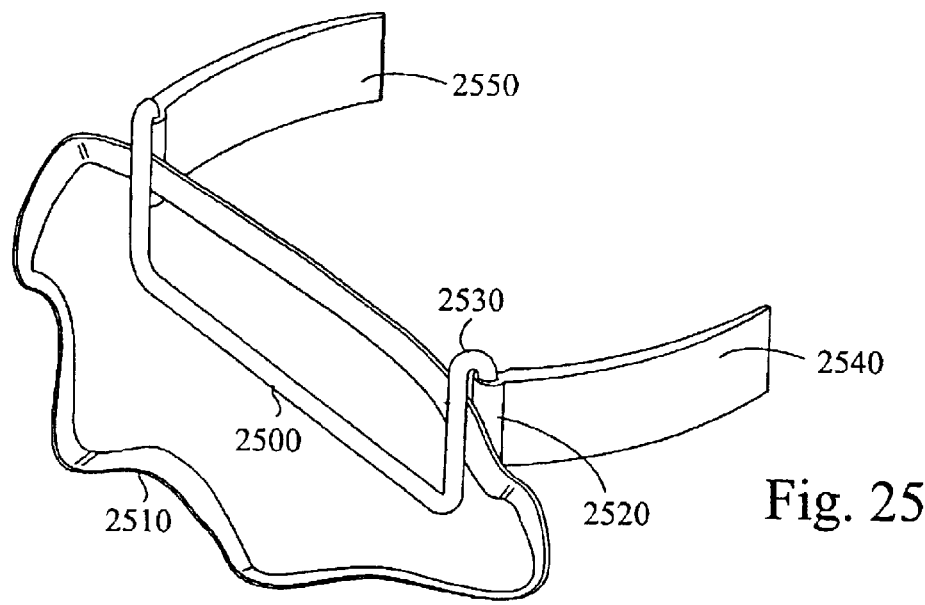
FIG. 25 illustrates one embodiment having a fold-over end portion.

FIG. 25 illustrates another embodiment of a headrest assembly which may be secured by a strap 2510. In the embodiment of FIG. 25, a single integral tubular member 2500 forms the center support member and forms fold-over end portions to provide support for hingedly attached wing members 2540 and 2550 and to guide strap attachment. The fold-over end portion may be a bend upwards, a first vertically extending portion in the tubular member 2500, followed by a bend 2530 (transverse portion), and a second vertically extending portion of the tubular member 2500. The downward outermost portion may form the axis for a hinging mechanism 2520 to attach the wing member 2540. The hinging mechanism 2520 may be any of the variety of torsion or friction hinges as previously discussed. The wing member 2550 may be similarly attached. As previously discussed, the hinge mechanism may be a torsion or friction hinging mechanism (e.g., a press-fit hinge) that provides an appropriate amount of resistance to support the weight of a head leaning against the wing member yet be manually movable.

The multiple vertically oriented portions also have the benefit of confining a strap 2510 that secures the winged headrest to a seat. In the embodiment shown in FIG. 25, the strap 2510 extends between the upward portion and the downward portion and exerts a force holding the headrest assembly in place. The headrest assembly is prevented from sliding too far downwardly because the bend portion limits the upward movement of the strap relative to the headrest assembly.

Although an integral tubular member may be a cost effective implementation, other implementations may not use a single integral tubular member. For example, multiple members may be used for the center portion and the two perpendicularly oriented portions, as well as their attachment to each other. Moreover, different shapes may be used, such as an H-shaped assembly, connecting the two vertical members in the middle. Other alternative shapes will be apparent to those of skill in the art. Furthermore, the tubular member need not be tubular in all embodiments. A variety of center members, from large flat surfaces (e.g., where the headrest assembly is integral to a seat) to other extruded shapes (e.g., rectangular, trapezoidal, curved, arched, or customized) may be used.

Figure 26A:
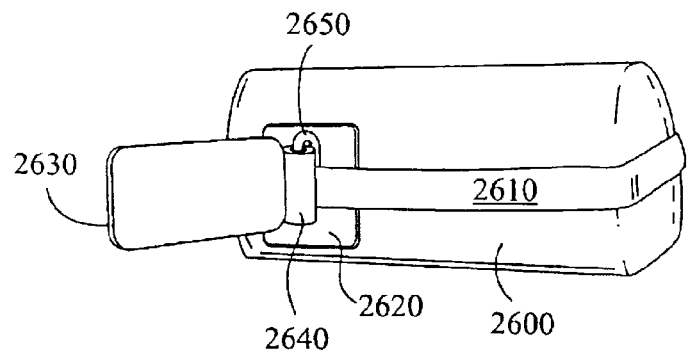
FIG. 26a illustrates one embodiment utilizing a strap and support member attached to the strap to support a hinged wing.

Another alternative is to omit the structural center portion altogether. FIG. 26a illustrates one embodiment utilizing a strap 2610 and support member 2620 attached to the strap 2610 to support a hinged wing member 2630. As discussed with respect to other embodiments, the wing member 2630 may be attached using a hinge 2640 which may be a variety of frictional or torsion hinge mechanisms. The strap 2610 may be strapped and secured about a headrest 2600. A strap attachment member 2650 attaches the headrest assembly to the strap 2610. In the embodiment of FIG. 26a, the support member 2620 is attached behind the strap 2610. The support member 2620 is a semi-rigid support member which provides some weight and rigidity to counter moments produced by a user moving the wing member 2630. The support member may be cloth, foam, rubber, elastomer, thermoplastic, or a combination of these or other convenient materials. The support member may be attached to the strap by a glue, sewing or a conventional attachment technique.

Figure 26B:
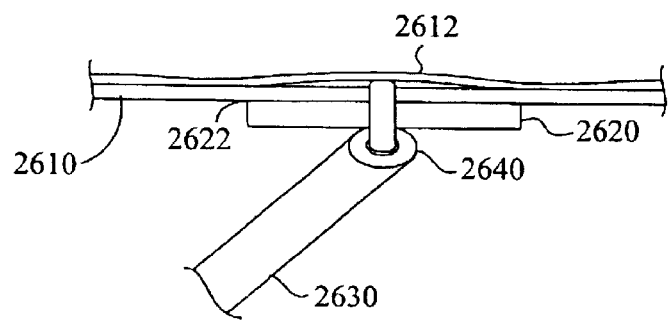
FIG. 26b illustrates a top view of another embodiment utilizing a strap and support member attached to the strap to support a hinged wing.

The embodiment of FIG. 26b illustrates an alternative embodiment in which the support member 2620 is attached to a front side of the strap 2610. The embodiment of FIG. 26b also illustrates a loop 2612 in the strap 2610 adapted to receive a strap attachment member 2650 which is attached to the assembly of the hinge 2640 and wing member 2630. The strap attachment member 2650 may be press fit into a bore in the top of the hinge 2640. FIG. 26b also shows the adhesive 2622, which may be glue, sewing, or other conventional attachment means, which adheres the strap 2610 to the support member 2620.

Figure 27:
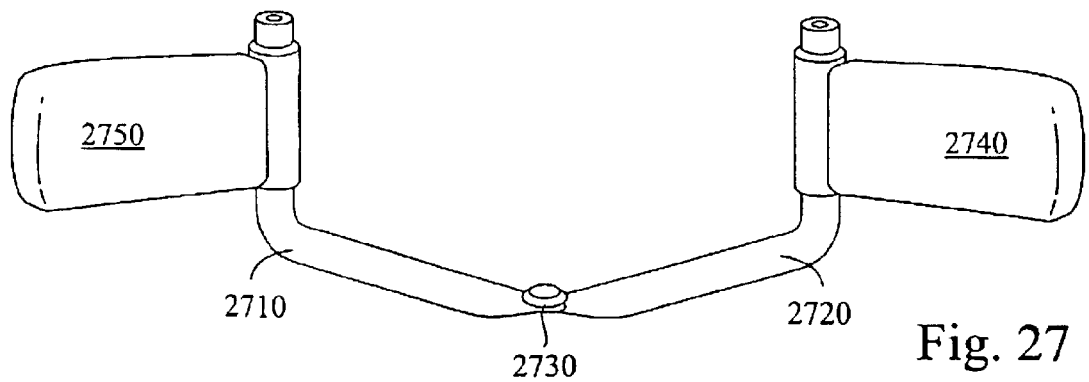
FIG. 27 illustrates an embodiment having a hinged center support member.

FIG. 27 illustrates an embodiment having a hinged center support member. In some embodiments, a headrest assembly with a hinged support member may be useful to adjust position of the wings and/or to adjust the relative position of the wings with respect to a portion of the center bar. The ability of the center hinge to yield may also be useful in avoiding head injuries in a crash situation. In the embodiment of FIG. 27, a left member 2710 and a right member 2720 are attached by a center hinge 2730. The center hinge 2730 may be a friction or torsion hinge providing some resistance to movement of the left member 2710 relative to the right member 2720. Wings 2740 and 2750 may be hingedly attached as described with respect to other embodiments, and various described or other means may be used to secure the headrest assembly to seat.

Figure 28:
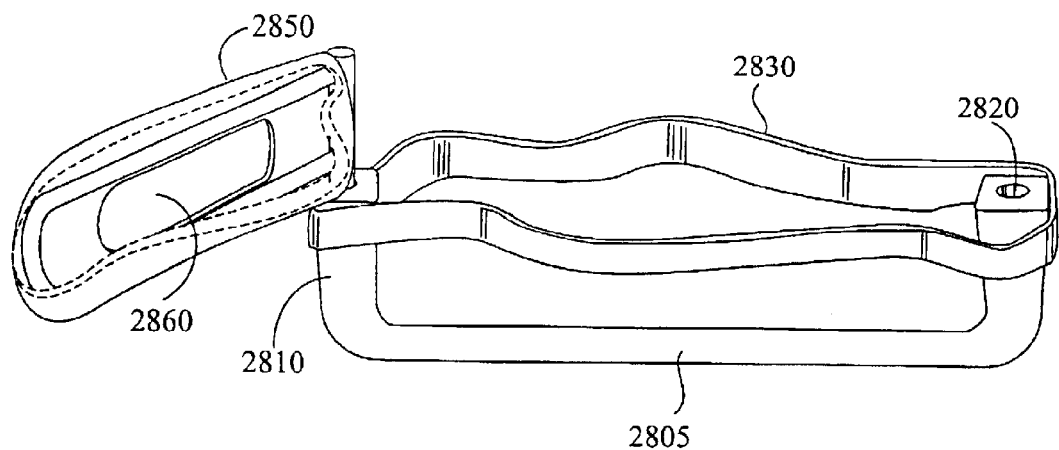
FIG. 28 illustrates another embodiment of a winged headrest.

FIG. 28 illustrates another embodiment of a winged headrest. The embodiment of FIG. 28 includes several features that may allow low cost production yet allow a high quality final product. For example, in one embodiment, a center member 2805 is integrally formed with two vertically extending foot portions (e.g., foot portion 2810). The foot portion is the portion below the wing and above or adjacent to the center member 2805. The foot portion on the right side is shown without a wing portion attached to provide additional details. A bore 2820 is formed in the right side foot portion. The bore 2820 is a slightly undersized bore such that a rod (e.g., a stainless steel rod) may be inserted into the bore 2820 to provide a press-fit friction hinge. In one embodiment, the wings are plastic and molded over the stainless steel rods which insert into the bores in the feet.

Each foot is widened out in comparison to the cross bar between the two feet. The wider foot provides a larger surface area to contact the usually compressive front surface of a seat. The larger surface area of the foot provides better support to counter the moment caused when the wing 2850 is moved while the winged headrest is attached to a seat. In some embodiments, the feet are a harder material than the center member, thereby providing rigidity and durability where needed, yet allowing the center member to flex and yield in the event of impact. For example, in one embodiment, the feet and center member are made of an ABS plastic. The feet may, however, be twenty percent glass-filled ABS to provide additional stiffness. In some embodiments, the feet may not be integrally formed, but rather may be fastened together (e.g., when fastening together two pieces is cheaper, safer, or otherwise better than processing a multi-material integral piece).

In the embodiment of FIG. 28, a strap 2830 may be seated directly below the wing members. A guide for the strap may be included in the upper portion of each foot. A user can strap the strap 2830 around a seat first, and then slide the headrest assembly downwardly between the strap and seat such that the strap aligns in the strap guides. The bottom portion of each foot may be rounded to facilitate insertion behind the strap.

To accommodate users of various heights, a user may choose to adjust where the strap is attached to the seat or where the strap falls on the headrest assembly (i.e., how far downwardly the headrest is inserted behind the strap). Some embodiments may include multiple strap guides to allow flexibility in positioning of the headrest. With such adjustments, a wide variety of users of different sizes are able to find a comfortable position, such as having the wing supporting the user's cheek and the cross-bar (center member 2805) fitting the cavity of the user's neck.

The embodiment of FIG. 28 also includes safety features. First, the wing 2850 can be bowed slightly outwardly (see, e.g., FIGS. 16a, 16b, 17, 21a, 21b). Additionally, the wing 2850 has an outer frame, but has a cavity 2860 to reduce the rigidity of the wing frame. The cavity may be one oblong cavity as shown or may be two or more separate holes drilled or otherwise formed in a process such as injection molding. Due to the outward bow of the wing, impacts cause the wing to bend outwardly, providing a moment that causes the wing to rotate outwardly. The cavity or holes in the wing also enhance the outward moment when the wing is impacted. Notably, the wings may have rounded surfaces for safety and comfort, and are typically covered by a padding when in use.

In one embodiment, each rod which forms the axis of the hinge is 0.3700 to 0.3702 inches, and the bores in the plastic of the headrest assembly that receive the rods are 0.3685 to 0.3690 inches, resulting in an interference of approximately ten to fifteen ten-thousandths of an inch. This embodiment requires a torque of approximately fifteen to thirty inch-pounds of torque to move each wing. Additionally, in this one specific example, the center bar may be approximately 7.4 inches in length and approximately three-eighths inch in diameter, the wings approximately two inches in height and five inches in length.

In one embodiment, a pivot such as that shown in FIG. 23c may be added to a headrest having an elongated center member with vertically extending end portions such as the embodiment of FIG. 28. In this embodiment, the user can also use the headrest in a U-shaped configuration. If the hinges are used to rotated the wings to approximately perpendicular to the center bar and then rotated upwardly on the pivots, a U shape results. The user may therefore gain an additional headrest position (although padding over the center portion may be desirable in this position).

Figure 29:
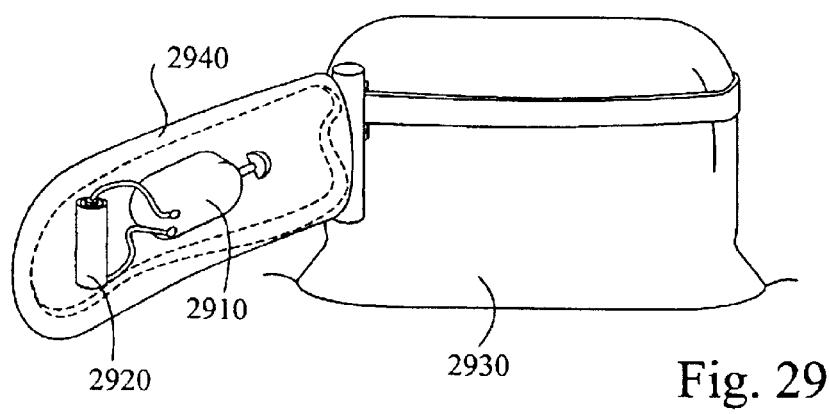
FIG. 29 illustrates an embodiment of a headrest having a vibrating wing member.

An embodiment of a vibrating headrest is shown in FIG. 29. In the embodiment of FIG. 29, a wing 2940 is hingedly attached to a headrest 2930 by a friction hinge strapped to the headrest. The wing 2940 includes a motor 2910 powered by a battery 2920. Alternatively, the motor may be powered by DC or AC current supplied from external to the wing, external to the headrest, or external to the seat. The motor 2910 has a rotor with a bent portion and a mass attached thereto to provide a subtle vibrating of the wing 2940. Other known or otherwise available vibration techniques or mechanisms may be used as well. In any case, the user may enjoy a massage while using the headrest. Additionally, vibration mechanisms may be provided in both wings, and/or in the center member 2930. Furthermore, a vibration mechanism may be added to any of the variety of headrests in wing or center portions.

Additionally, the vibrating wing concept may be applicable as use for a general therapeutic device. For example, the wing may be strapped via the strap (or otherwise secured) to a person, and the friction hinge may be positioned and maintained enough pressure to hold the vibrating wing in place. A power adapter to plug in may be desirable for therapeutic device embodiments, as may be a more rigorous vibration mechanism to apply sufficient vibration to have therapeutic effect. A power switch which may have adjustments such as vibrating frequency, intensity, etc., may be provided on the center member, thereby allowing the user to adjust the vibration and pressure to an appropriate level, and then to let the wings maintain the position of the assembly. The wings may have one or both sides as a rubberized material instead of a foam pad which would damped vibrations. In alternative embodiments, the wings may additionally or instead of the vibration mechanism have either or both of a heating element and a transdermal electrical muscle stimulant (TEMS) element.

Figure 7:
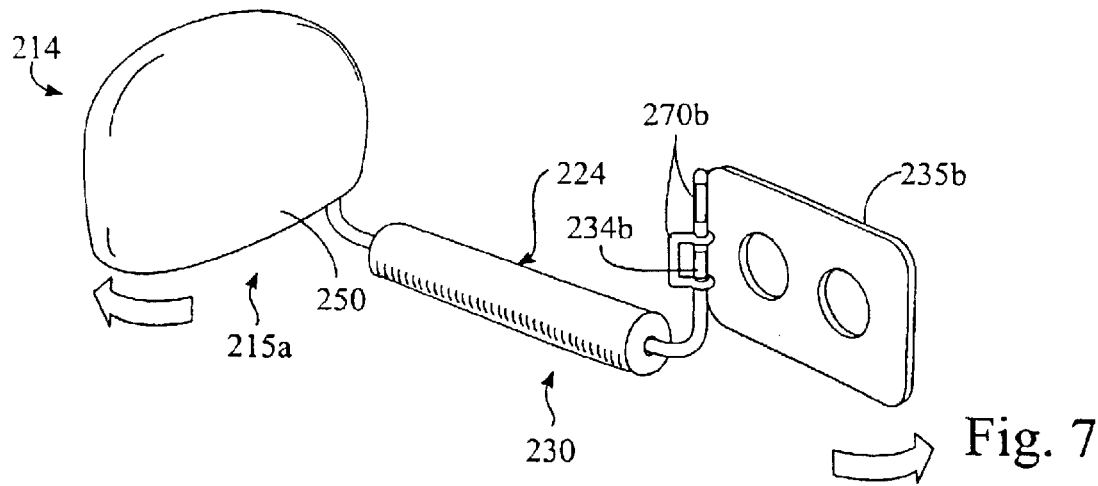
FIG. 7 is a perspective, partially cut-away view of the portable headrest illustrated in FIG. 6.
Figure 8A:
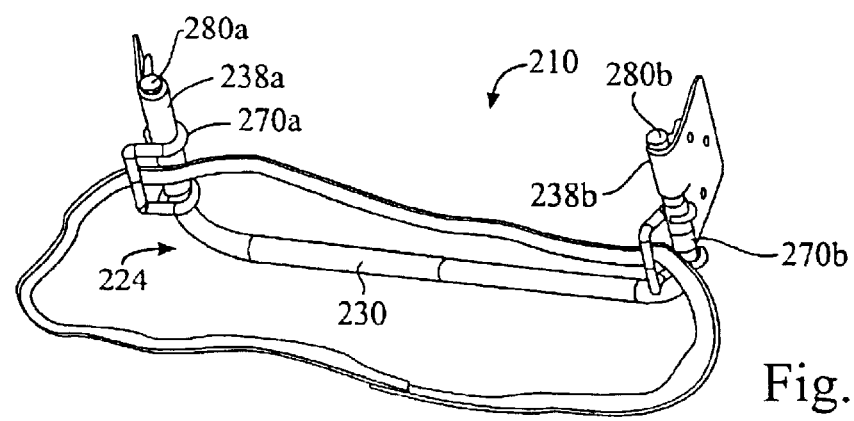
FIGS. 8A–8C illustrate perspective, end and top views of one embodiment of the frame of the headrest illustrated in FIG. 6.
Figure 8B:
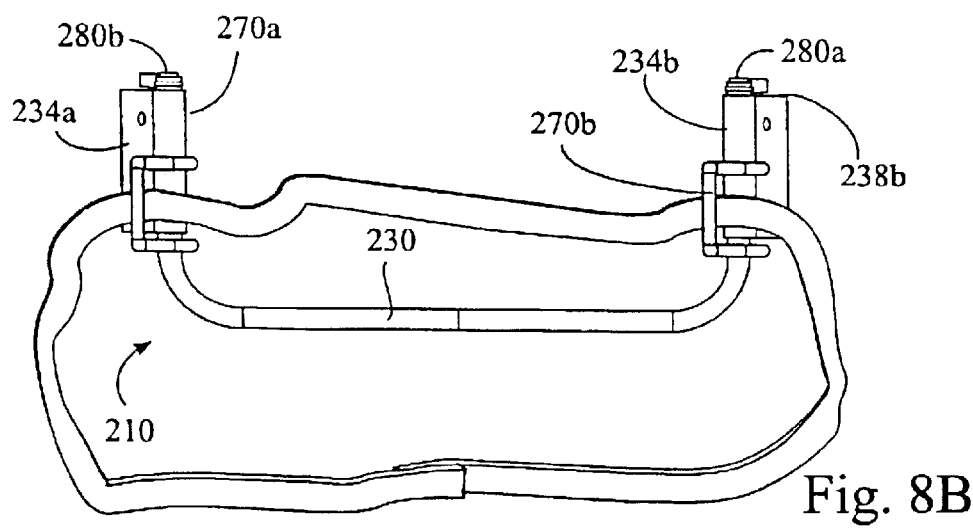
Figure 8C:
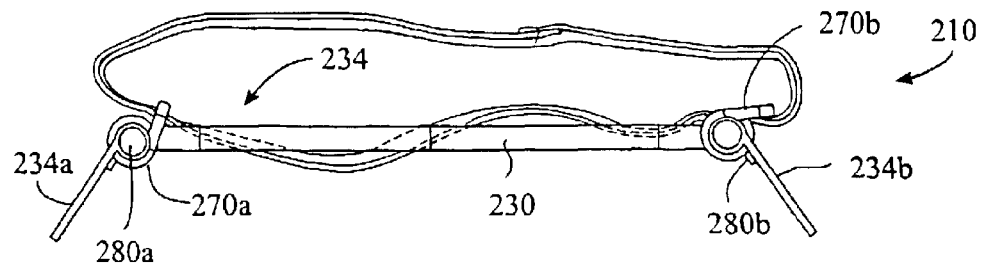

Embodiments such as those shown in FIGS. 7, 21b, and 28 with cross bar members may employ vibrating (or otherwise therapy-providing) wings to form a massager, wherein the torsion of the vibrating wings clamps the assembly onto a muscle or body portion. For example, the wings may clamp the entire assembly onto a thigh in order to massage that thigh. A strap may be unnecessary in some embodiments, with just the pressure maintained by the torsion hinges holding the assembly in place. It may also be desirable to increase the torque requirement to move the wings, to a minimum of between twenty-five and fifty inch pounds. Additionally, it may be desirable to employ a hinged center member (see, e.g., FIG. 27) a telescoping center member, or an otherwise adjustable center member to adjust the distance between the wings. An adjustable center member allows various muscle groups or body parts to be clamped between the vibrating wings, to apply a therapeutic massage. The adjustable center member may provide a locking mechanism so that once the user has determined the desired wing width, the center member can be locked so that the wings may be rotated without inadvertently changing the center member adjustment.

Advantageously, some embodiments of the friction hinge based massager allow hands-free operation. One major drawback of many current massagers is the need to continually apply pressure and/or to hold the massager in place. By the use of friction hinges to clamp the assembly in place (and perhaps an additional optional strap), the need to hold the assembly in place may be reduced and/or eliminated. Moreover, the friction hinge assembly is quite compact (especially when in a the folded position) and much less cumbersome than many other massage devices. Furthermore, an assembly with friction hinge mounted wings can be an all-in-one headrest and versatile massager. In one instance it may be used as a headrest, but it may also be used as a massager. One side of each wing may be a relatively hard or rubberized material (e.g., thermoplastic elastomer, rubberized polyurethane, or Santoprene) that transmits vibration, and the other side may be padded. An optional headrest strap used to secure some embodiments to the seat can double as a strap to secure the massager to a particular body part, and an optional adjustable center member may allow easy adjustment to head widths as well as other body parts.

Figure 30:
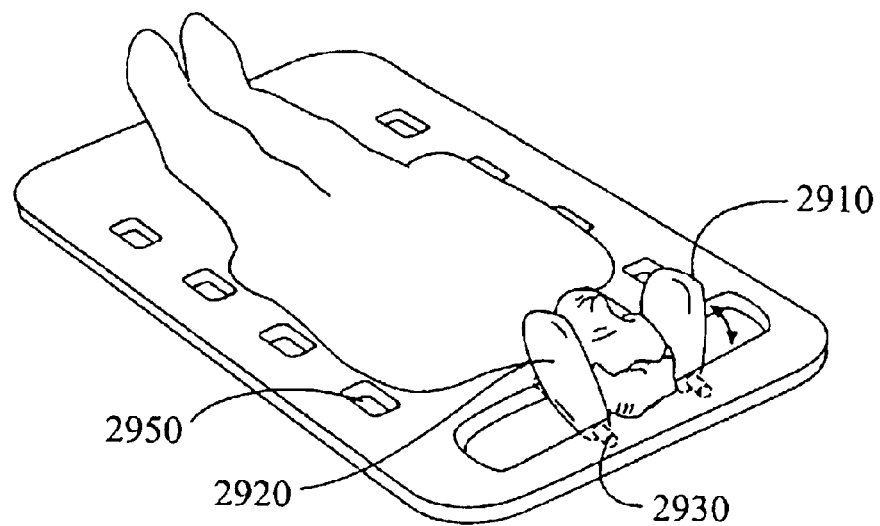
FIG. 30 illustrates an embodiment of a stretcher having an integral winged headrest.

FIG. 30 illustrates another example of an integral winged headrest. In the embodiment of FIG. 30, the winged headrest is included as a part of a stretcher, with the center member being a portion of the stretcher itself. Two wings 2910 and 2920 are hingedly attached to the stretcher by a friction hinge. A rod 2930 forming the hinge axis may be snapped into or otherwise secured to the stretcher itself. The rod 2930 or a portion thereof may be housed in a casing to facilitate a reliable and flush connection to the stretcher.

In the case of a stretcher, a friction hinge which yields at a higher force may be appropriate due to the importance of immobilizing the head of the person on the stretcher. Thus, a torque of thirty to forty inch-pounds may be required to move each wing. The wings may be positioned in apertures in the stretcher. The apertures may be cut-out portions, holes formed in the stretcher, or just recesses in the surface of the stretcher. The apertures may extend outwardly to form a handle similar to other handles (e.g., handle 2950) typically found on a stretcher.

Additionally, it may be desirable to use easily cleaned padding and/or covers for the wings 2910. For example, a closed cell foam, a vinyl dipped closed cell foam, or other readily washable materials that will generally not hold contaminants may be used to cushion the wings. Furthermore, it may also be desirable to have larger wings in the case of a stretcher, and perhaps a wing-locking strap. It may be desirable to prevent a patient from seeing what is happening in the vicinity and/or to ensure the entire head is immobilized using larger wings. Accordingly, one embodiment uses wings of ten inches in length and three to five inches in width. To lock the wings, a strap may wrap around upper portions of both wings, thereby preventing the wings from rotating downwardly.

Figure 31:
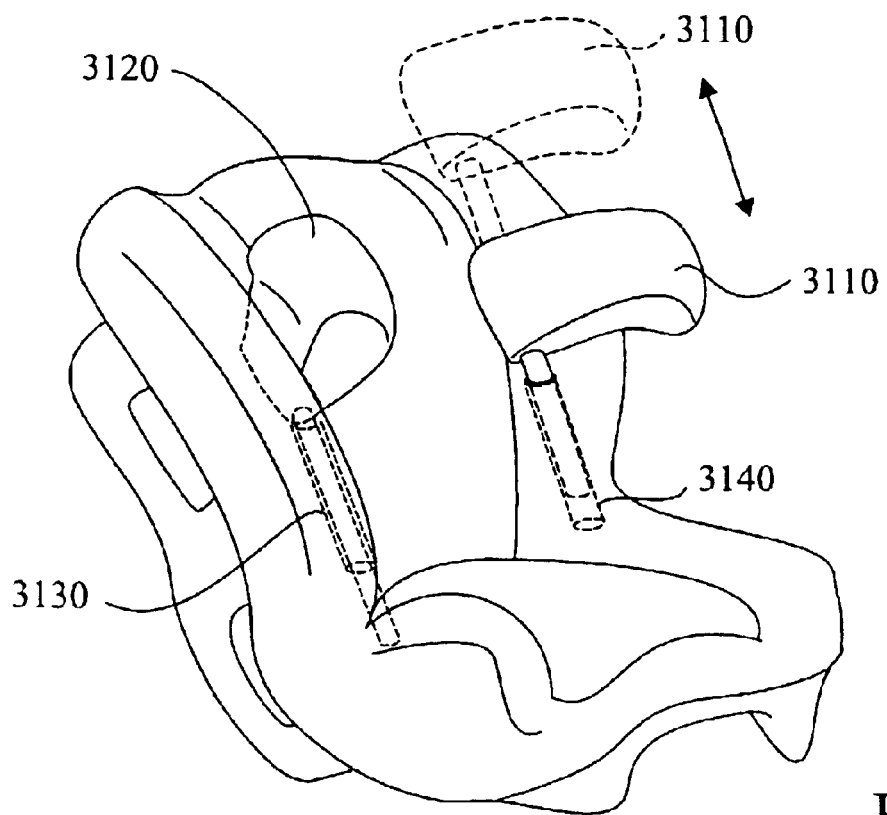
FIG. 31 illustrates an embodiment of a child seat having a winged headrest.

FIG. 31 illustrates another application of the winged headrest concept. In the embodiment of FIG. 31, a child seat is equipped with two wings on friction or torsion hinge mechanisms. Wings 3110 and 3130 are hingedly attached to the child seat, and can support the weight of the child's head leaning against the wing. Due to the lighter weight of a child's head, the hinging mechanism may yield, allowing rotation of the wing when a force of between ten and twenty inch pounds is applied. Moreover, the wing members may be smaller than in some other embodiments. For example, in one embodiment, the wings may be five to six inches apart, three to four inches in length, and one to three inches in height.

The wings may be attached to the child seat in a variety of manners. In the illustrated embodiment, rods 3130 and 3140 are provided for mounting of the wings 3110 and 3120. As indicated with respect to wing 3110, the wing may be movable along the rod 3140 to provide adjustment for different size (height) children. The wings may pivot on the rod 3140 or may pivot on a sliding portion attached to the rod. Alternatively, the wings may be connected to the baby seat by friction hinge mechanisms directly affixed to or molded into the child seat.

The rods 3130 and 3140 may be molded into side portions of the child seat as indicated in FIG. 31, or they may be molded into or mounted onto the back portion of the child seat if it is desirable to place the wings closer together than a mounting on the side portions would allow. In either case, the wings can be rotated about the hinging mechanism to provide a resting position for the child's head. In another alternative embodiment, the hinging mechanisms may be slidable horizontally to accommodate children with different head widths. In any case, the friction hinge winged headrest may be quite effectively utilized in a variety of arrangements for a child seat.

Thus, a description of various features and embodiments of headrests has been provided. While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure.

What is claimed is:

1. A headrest comprising:

a rear head support portion;

a first head support wing member rotatable upwardly and downwardly relative to the rear head support portion, the first head support wing member being rotatable vertically to a first head support position from a first stowed position, said first head support wing member also being pivotable horizontally relative to the rear head support portion.

2. The headrest of claim 1 further comprising:

a second head support wing member rotatable upwardly and downwardly relative to the rear head support portion independently of the first head support wing member, the second head support wing member being rotatable downwardly to a second head support position from a second stowed position, the second head support wing member also being pivotable horizontally relative to the rear head support portion.

an interconnecting member comprising at least one stem to engage a seat.

3. The headrest of claim 1 wherein said rear head support portion comprises a plastic frame having an aperture.

4. The headrest of claim 3 wherein said first head support wing member and said second head support wing member each comprise an elongated head support wing member having a first end portion and a crash compressive portion, wherein the elongated head support wing member rotates about a pivotal attachment to the rear head support portion that couples to the first end portion of the elongated head support wing member.

5. The headrest of claim 3 wherein said first head support wing member is flush with said rear head support portion in said first stowed position and wherein said second head support wing member is flush with said rear head support portion in said second stowed position.

6. The headrest of claim 5 wherein said first head support wing member sustains the load of a human head leaning against the first head support wing member in a plurality of positions throughout a range of motion but moves when a greater force is applied.

7. The headrest of claim 1 wherein said first head support wing member sustains a load of a human head leaning against the first head support wing member in a plurality of in-use positions but moves when a greater force is applied.

8. A seat comprising:

a first head support member pivotably attached to a first seat portion by a first pivotal attachment coupled to a first end of the first head support member, the first head support member being movable via the first pivotal attachment in a first direction and in a second direction that is substantially transverse to the first direction;

a second head support member pivotably attached to a second seat portion by a second pivotal attachment coupled to a first end of the second head support member, the second head support member being movable via the second pivotal attachment in the first direction and in a third direction substantially transverse to the first direction.

9. The seat of claim 8 wherein said first head support member and said second head support member are independently pivotable.

10. The seat of claim 9 wherein said first head support member is to support a load of a human head leaning against the first head support member in a plurality of in-use positions, said first head support member to move when a greater force than the load of the human head leaning against the first head support member is applied.

11. The seat of claim 8 wherein said first head support member and said second head support member are motorized and controllable by a user.

12. A headrest comprising:
a headrest body portion;
a first head support member pivotably attached to the headrest body portion by a first frictional mechanism, the first head support member being pivotable relative to the headrest body portion to a first plurality of in-use positions between a flat position and an acute angle rotation stop position, the first head support member being maintained in any of the first plurality of in-use positions under a load of human head leaning against the first head support member, the first head support member to move if a greater load than the load of a human head leaning against the first head support member is applied.

13. The headrest of claim 12 further comprising:
a second head support member pivotably attached to the headrest body portion by a second frictional mechanism, the second head support member being independently pivotable relative to the headrest body portion to a second plurality of in-use positions, the second head support member being maintained in any of the second plurality of in-use positions under the load of the human head leaning against the second head support member, the second head support member to move if the greater load than the load of the human head leaning against the second head support member is applied.

14. The headrest of claim 13 wherein the each of the first head support member and the second head support member is unassistedly maintained in a continuous plurality of positions throughout a range of motion under the load of the human head leaning against the respective head support member but moves when the greater load is applied.

15. The headrest of claim 12 wherein said first head support member is pivotable vertically relative to the headrest body portion.

16. The headrest of claim 15 further comprising:
at least one stem member extending substantially vertically downwardly from the headrest body portion.

17. The headrest of claim 16 wherein said first head support member is also pivotable horizontally relative the headrest body portion.

18. The headrest of claim 12 wherein said first head support member is pivotable horizontally relative the headrest body portion.

19. The headrest of claim 18 further comprising a rotation stop to limit forward horizontal rotation of the first head support member from a flat position to an acute angle with respect to the flat position of approximately seventy degrees or less.

20. The headrest of claim 13 wherein said first head support member and said second head support member are each pivotable in multiple directions.

21. A headrest comprising:
a headrest back portion;
a first lateral support member pivotally connected to the headrest back portion, the first lateral support member being movable to pivot about a first substantially vertical axis from a first substantially flat position in which the first lateral support member is substantially parallel to the headrest back portion to a rotation stop which limits pivoting of the first lateral support member to a first acute angle with respect to said headrest back portion, said first lateral support member being maintained in any of a plurality of first lateral support member positions between the first substantially flat position and the first acute angle, said first lateral support member to pivot if a greater force than a human head leaning against the first lateral support member is applied.

22. The headrest of claim 21 further comprising:
a second lateral support member pivotally connected to the headrest back portion, the second lateral support member being movable to pivot about a second substantially vertical axis from a second substantially flat position in which the second lateral support member is substantially parallel to the headrest back portion to a second acute angle with respect to said headrest back portion, said second lateral support member being maintained in any of a plurality of second lateral support member positions between the first substantially flat position and the second acute angle, said second lateral support member to pivot if the greater force than the human head leaning against the second lateral support member is applied.

23. The headrest of claim 22 further comprising:
an interconnecting member comprising at least one stem extending downwardly from the headrest back portion to attach to a seat.

24. The headrest of claim 23 wherein said first lateral support member and said second lateral support member are each positionable continuously throughout a range of motion from the respective stowed positions to rotation stop positions.

25. The headrest of claim 22 wherein said first lateral support member and said second lateral support member each comprises a crash compressive portion.

26. The headrest of claim 23 wherein said first lateral support member and said second lateral support member each comprises a crash compressive portion.

27. The headrest of claim 22 wherein said headrest comprises a plastic frame portion.

28. The headrest of claim 26 wherein said headrest comprises a plastic frame portion having an aperture.

29. The headrest of claim 22 wherein said first acute angle and said second acute angle are fixed angles set by rotation stops that stop respectively the first lateral support member and said second lateral support member at a selected pivoted-outwardly angle of less than or equal to about seventy degrees from respectively the first substantially flat position and the second substantially flat position.

30. The headrest of claim 28 wherein said first acute angle and said second acute angle are fixed angles set by rotation stops that stop respectively the first lateral support member and said second lateral support member at a selected pivoted-outwardly angle of less than or equal to about seventy degrees from respectively the first substantially flat position and the second substantially flat position.

31. The headrest of claim 22 further comprising a speaker disposed in said first lateral support member.

32. The headrest of claim 30 further comprising a speaker disposed in said first lateral support member.

33. The headrest of claim 22 wherein each of the first lateral support member and the second lateral support member is motorized.

34. A headrest comprising:
a head rest back portion;
a first wing, said first wing being pivotable from a first flat position to a first limit position, wherein said first wing is substantially parallel to a front face of the headrest back portion in the first flat position and wherein the first wing is limited to pivoting through a first acute angle at the first limit position, said first wing being sustained in a first plurality of positions between the first flat position and the first limit position under the load of a human head leaning against the first wing and yielding when a greater load is applied;

a second wing, said second wing being pivotable from a second flat position to a second limit position, wherein said second wing is substantially parallel to the front face of the headrest back portion in the second flat position and wherein the second wing is limited to pivoting through a second acute angle at the second limit position, said second wing being sustained in a second plurality of positions between the second flat position and the second limit position under the load of the human head leaning against the second wing and yielding when the greater load is applied.

35. The headrest of claim 34 wherein said headrest back portion comprises a plastic frame having an aperture.

36. The headrest of claim 34 wherein said first wing and said second wing each comprises a crash compressive portion.

37. The headrest of claim 35 wherein said first wing and said second wing each comprises a plastic wing portion.

38. The headrest of claim 35 further comprising an elongated stem member extending from said headrest back portion.

39. The headrest of claim 38 wherein said first wing comprises a first speaker and wherein said second wing comprises a second speaker, and further wherein each of said wing and said second wing are motorized.

40. The headrest of claim 35 wherein said first acute angle is approximately equal to or less than seventy degrees and wherein said second acute angle is approximately equal to or less than seventy degrees.

41. The headrest of claim 40 wherein said first wing and said second wing are positionable by a motorized mechanism.

* * * * *